(12) United States Patent
Wittkopp et al.

(10) Patent No.: US 7,713,162 B2
(45) Date of Patent: *May 11, 2010

(54) MULTI-SPEED TRANSMISSION

(75) Inventors: Scott H. Wittkopp, Ypsilanti, MI (US); James M. Hart, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 143 days.

This patent is subject to a terminal disclaimer.

(21) Appl. No.: 11/929,196

(22) Filed: Oct. 30, 2007

(65) Prior Publication Data

US 2008/0125275 A1 May 29, 2008

Related U.S. Application Data

(62) Division of application No. 11/771,393, filed on Jun. 29, 2007, now Pat. No. 7,488,268.

(60) Provisional application No. 60/867,683, filed on Nov. 29, 2006.

(51) Int. Cl.
*F16H 3/44* (2006.01)
(52) U.S. Cl. .................. 475/284; 475/323
(58) Field of Classification Search ......... 475/275–291, 475/323
See application file for complete search history.

(56) References Cited

U.S. PATENT DOCUMENTS

| | | | |
|---|---|---|---|
| 6,547,688 B2 * | 4/2003 | Takagi et al. ............... | 475/276 |
| 6,659,904 B1 | 12/2003 | Usoro et al. | |
| 6,913,556 B2 * | 7/2005 | Armstrong et al. .......... | 475/269 |
| 2005/0026742 A1* | 2/2005 | Tiesler et al. ............... | 475/284 |
| 2005/0215381 A1* | 9/2005 | Bucknor et al. ............. | 475/275 |

* cited by examiner

*Primary Examiner*—Roger Pang
(74) *Attorney, Agent, or Firm*—Quinn Law Group, PLLC.

(57) ABSTRACT

A multi-speed transmission has three planetary gear sets and six torque-transmitting mechanism packaged in various ones of five zones within a transmission cavity. Each planetary gear set has a ring gear member, a sun gear member and a carrier member that rotatably supports a plurality of pinion gears that intermesh with both the sun gear member and the ring gear member. Certain members are continuously connected for common rotation. Specifically, an interconnecting member continuously interconnects for common rotation the carrier member of the first planetary gear set, the sun gear member of the second planetary gear set and the ring gear member of the third planetary gear set. Additionally, the sun gear member of the first planetary gear set is grounded to the transmission casing via a radially-extending structural member.

8 Claims, 9 Drawing Sheets

| CLUTCH | ZONES | | | | |
|---|---|---|---|---|---|
| | I | II | III | IV | V |
| 150 | O | O | X | X | X |
| 152 | X | O | X | X | X |
| 154 | X | X | O | O | X |
| 156 | X | X | O | O | O |
| 157 | O | X | O | O | O |
| 158 | X | X | X | O | X |

| CLUTCH | ZONES | | | | |
|---|---|---|---|---|---|
| | I | II | III | IV | V |
| 350 | X | X | O | O | X |
| 352 | X | X | O | O | O |
| 354 | O | O | X | O | O |
| 356 | O | O | X | X | O |
| 357 | X | X | X | O | X |
| 358 | X | X | X | X | X |

| CLUTCH | ZONES | | | | |
|---|---|---|---|---|---|
| | I | II | III | IV | V |
| 450 | x | x | o | o | x |
| 452 | x | x | o | o | x |
| 454 | o | o | x | x | o |
| 456 | o | o | x | x | o |
| 457 | x | x | x | x | x |
| 458 | o | x | x | x | x |

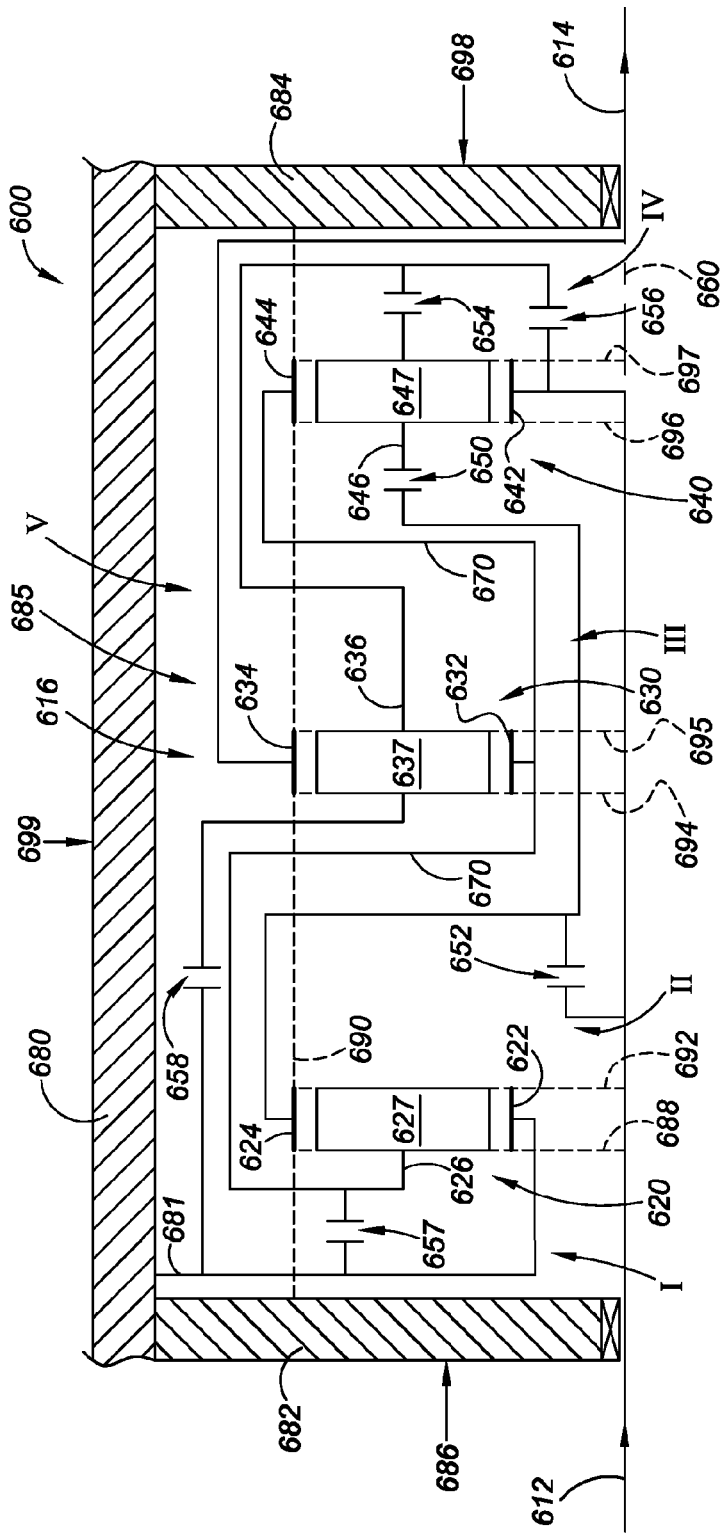

| CLUTCH | ZONES | | | | |
|---|---|---|---|---|---|
| | I | II | III | IV | V |
| 750 | O | X | X | X | O |
| 752 | O | X | X | X | O |
| 754 | X | X | O | O | X |
| 756 | X | X | O | O | X |
| 757 | X | O | X | X | X |
| 758 | X | O | X | O | X |

MULTI-SPEED TRANSMISSION

CROSS-REFERENCE TO RELATED APPLICATIONS

This application claims the benefit of U.S. Provisional Application No. 60/867,683, filed Nov. 29, 2006, and is a divisional application of U.S. patent application Ser. No. 11/771,393, filed Jun. 29, 2007, both of which are hereby incorporated by reference in their entireties.

TECHNICAL FIELD

This invention relates to a multi-speed transmission for a vehicle providing a plurality of forward speed ratios and at least one reverse speed ratio through selective engagement of six torque-transmitting mechanisms located in a selected zone or zones of the transmission.

BACKGROUND OF THE INVENTION

Multi-speed transmissions in automotive vehicles allow for operating efficiency and smooth feel. Multiple planetary gear sets have been utilized to provide eight or more forward speed ratios with relatively efficient packaging due to the compact nature of planetary gear sets. A number of selectively engagable torque-transmitting mechanisms are controlled to interconnect different members of the planetary gear sets with one another, with the transmission casing, or sometimes with the transmission input or output member to achieve the various speed ratios. Efficient packaging of the torque-transmitting mechanisms helps to minimize the overall dimensions of the transmission, potentially allowing its use in more vehicle platforms, reducing weight, and minimizing manufacturing complexity.

SUMMARY OF THE INVENTION

A multi-speed transmission is provided with three planetary gear sets, each having a ring gear member, a sun gear member and a carrier member that rotatably supports a plurality of pinion gears that intermesh with both the sun gear member and the ring gear member. Certain members of the gear sets are continuously connected for common rotation. Specifically, an interconnecting member continuously interconnects for common rotation the carrier member of the first planetary gear set, the sun gear member of the second planetary gear set and the ring gear member of the third planetary gear set. Additionally, the sun gear member of the first planetary gear set is continuously grounded to the transmission casing.

Preferably, an input member is continuously interconnected for common rotation with the sun gear member of the third planetary gear set, and an output member is continuously interconnected for common rotation with the ring gear member of the second planetary gear set.

Six torque-transmitting mechanisms are selectively engagable to connect selected members of the planetary gear sets for common rotation. The six torque-transmitting mechanisms are engagable in different combinations to achieve eight forward speed ratios and a reverse speed ratio between the input member and the output member.

A transmission casing surrounds the planetary gear sets and torque-transmitting mechanisms and defines a cavity having five different zones. The transmission casing includes opposing first and second end walls and a housing portion therebetween. As used herein, a "zone" is a portion of the cavity. A first zone extends axially from the first end wall to one of the planetary gear sets. A second and a third zone each extends between different adjacent pairs of the planetary gear sets. A fourth zone extends from another one of the planetary gear sets to the second end wall. Each of the first, second, third, and fourth zones extends radially to an outer surface of a radially-outermost one of the members. A fifth zone borders the first, second, third, and fourth zones, extends radially outward to the housing portion and extends axially between the first and second end walls.

Each torque-transmitting mechanism may be located in selected ones of the zones that further desirability of (i) minimizing the overall size of the transmission, (ii) reducing weight, (iii) providing a convenient location for hydraulic feed to the torque-transmitting mechanism, such as by locating the torque-transmitting mechanism close to the transmission casing or to a centrally-located shaft, both of which typically define at least part of a feed path to supply hydraulic fluid to torque-transmitting mechanisms, and (iv) reducing the overall complexity (e.g., the number, shape and size of hub members and other interconnecting members used to connect members of the planetary gear sets with one another or with the transmission casing). Different embodiments of the transmission are possible by arranging the planetary gear sets in a different order (e.g., the order moving axially from the first end wall to the second end wall) in the transmission. The six torque-transmitting mechanisms are located in at least one of the five zones in each such embodiment within the scope of the invention.

Preferably, the sun gear member of the first planetary gear set is continuously grounded to the transmission casing via a radially-extending structural member. At least one of the torque-transmitting mechanisms selectively grounds one of the members of one of the planetary gear sets to the transmission casing via the radially-extending structural member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7A is a schematic, cross-sectional, partially fragmentary illustration of a seventh embodiment of a multi-speed transmission within the scope of the invention;

FIG. 7B is a chart listing the selected zones of the transmission casing of the transmission of FIG. 7A in which various torque-transmitting mechanisms may be located;

DESCRIPTION OF THE PREFERRED EMBODIMENTS

Figures 1A, 1B:
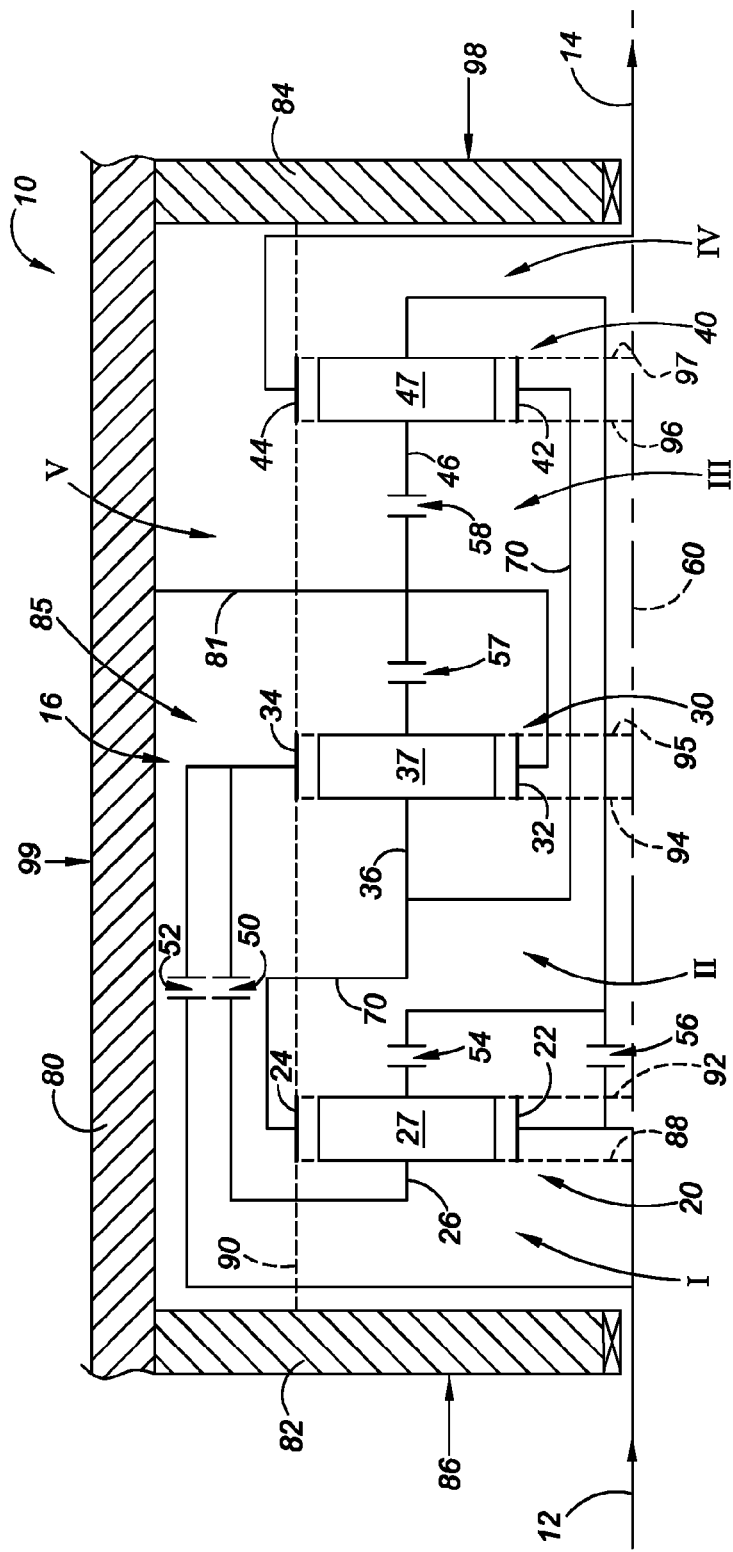
FIG. 1A is a schematic, cross-sectional, partially fragmentary illustration of a first embodiment of a multi-speed transmission within the scope of the invention.
FIG. 1B is a chart listing the selected zones of the transmission casing of the transmission of FIG. 1A in which various torque-transmitting mechanisms may be located.

Referring to the drawings, wherein like reference numbers refer to like components, FIG. 1A shows a transmission 10 having an input member 12 for receiving power from a power source such as an internal combustion engine and output member 14 for delivering power to a final drive mechanism such as the wheels of a vehicle.

The transmission 10 includes a gearing arrangement 16 having three planetary gear sets 20, 30 and 40 and six selectively engagable torque-transmitting mechanisms 50, 52, 54, 56, 57 and 58. Each planetary gear set 20, 30 and 40 includes rotatable components concentric with a centerline 60 of the transmission 10. Specifically, planetary gear set 20 includes a sun gear member 22, a ring gear member 24 and a carrier member 26 that rotatably supports a plurality of pinion gears 27 that intermesh with both the sun gear member 22 and the ring gear member 24. Planetary gear set 30 includes a sun gear member 32, a ring gear member 34 and a carrier member 36 that rotatably supports a plurality of pinion gears 37 that intermesh with both the sun gear member 32 and the ring gear member 34. Planetary gear set 40 includes a sun gear member 42, a ring gear member 44 and a carrier member 46 that rotatably supports a plurality of pinion gears 47 that intermesh with both the sun gear member 42 and the ring gear member 44.

In referring to the first, second and third gear planetary gear sets in this description and in the claims, these sets may be counted "first" to "third" in any order in the drawings (i.e., left to right, right to left, etc.). In the embodiment of FIG. 1A, planetary gear set 30 is the first planetary gear set, planetary gear set 40 is the second planetary gear set, and planetary gear set 20 is the third planetary gear set.

The input member 12 is continuously connected for common rotation with sun gear member 22. The output member 14 is continuously connected for common rotation with ring gear member 44. An interconnecting member 70 continuously interconnects ring gear member 24 with carrier member 36 and sun gear member 42. The interconnecting member 70 may be one component or multiple components. The sun gear member 32 is continuously grounded to a housing 80 (also referred to herein as a housing portion) of the transmission 10 via a radially-extending structural member 81. The housing 80 circumferentially surrounds the gear sets 20, 30 and 40 as well as the torque-transmitting mechanisms 50, 52, 54, 56, 57 and 58. The transmission 10 further includes a first end wall 82 generally at one end of the transmission 10 and a second end wall 84 generally at an opposing end of the transmission 10. The housing 80 joins the first and second end walls 82, 84. It should be appreciated that the housing 80 and the first and second end walls 82, 84 form a transmission casing, and may be integrated, or may each be a separate component or components of the casing. The transmission casing may be referred to herein as 80, 82, 84. The transmission casing 80, 82, 84 defines a cavity 85. The end walls 82 and 84 enclose the cavity 85 axially, but are likely a conical or irregular shape rather than a planar shape as schematically depicted.

The planetary gear sets 20, 30, and 40 and torque-transmitting mechanisms 50, 52, 54, 56, 57, and 58 are located in the cavity 85. The housing 80, end walls 82 and 84 and the planetary gear sets 20, 30 and 40 cooperate to define five spaces or zones within the cavity 85. A first zone I is defined between an outer surface 86 of the first end wall 82 and a plane 88 running generally parallel with a side of the planetary gear set 20 adjacent the first end wall 82, and runs radially outward to a circumferential boundary 90 running along a radially-outermost periphery of each of the ring gear members 24, 34 and 44. A second zone II is defined between a plane 92 running generally parallel along a side of the planetary gear set 20 facing the planetary gear set 30, a plane 94 running generally parallel along a side of the planetary gear set 30 facing the planetary gear set 20 and the circumferential boundary 90. A third zone III is defined between a plane 95 running generally parallel along a side of the planetary gear set 30 facing the planetary gear set 40, a plane 96 running generally parallel along a side of the planetary gear set 40 facing the planetary gear set 30 and the circumferential boundary 90. A fourth zone IV is defined between a plane 97 running generally parallel along a side of the planetary gear set 40 facing the second end wall 84, an outer surface 98 of the second end wall 84 and the circumferential boundary 90. A fifth zone V is defined between the circumferential boundary 90, an outer surface 99 of the housing 80, and the outer surfaces 86 and 98 of the first and second end walls 82 and 84, respectively. The structural member 81 traverses zones III and V.

Torque-transmitting mechanisms 50, 52, 54, and 56 are rotating-type clutches and torque-transmitting mechanisms 57 and 58 are brakes, also referred to as reaction clutches or stationary clutches. Torque-transmitting mechanism 50 is selectively engagable to connect the carrier member 26 for common rotation with the ring gear member 34. The torque-transmitting mechanism 52 is selectively engagable to connect the input member 12 and the sun gear member 22 for common rotation with the ring gear member 34. The torque-transmitting mechanism 54 is selectively engagable to connect the carrier member 26 for common rotation with the carrier member 46. The torque-transmitting mechanism 56 is selectively engagable to connect the input member 12 and the sun gear member 22 for common rotation with the carrier member 46. The torque-transmitting mechanism 57 is selectively engagable to ground the carrier member 36 (as well as the ring gear member 24 and sun gear member 42) to the transmission housing 80 via the structural member 81. The torque-transmitting mechanism 58 is selectively engagable to ground the carrier member 46 to the transmission housing 80 via the structural member 81.

The transmission 10 provides eight forward speed ratios and one reverse speed ratio between the input member 12 and the output member 14. Specifically, a reverse speed ratio is established by engaging torque-transmitting mechanisms 52 and 58; a first forward speed ratio is established by engaging torque-transmitting mechanisms 54 and 58; a second forward speed ratio is established by engaging torque-transmitting mechanisms 54 and 57; a third forward speed ratio is established by engaging torque-transmitting mechanisms 50 and 54; a fourth forward speed ratio is established by engaging torque-transmitting mechanisms 52 and 54; a fifth forward speed ratio is established by engaging torque-transmitting mechanisms 54 and 56; a sixth forward speed ratio is established by engaging torque-transmitting mechanisms 52 and 56; a seventh forward speed ratio is established by engaging torque-transmitting mechanisms 50 and 56; and an eighth forward speed ratio is established by engaging torque-transmitting mechanisms 56 and 57. Preferably, in all embodiments of the invention, at least three of the speed ratios are overdrive ratios.

As shown in FIG. 1A, torque-transmitting mechanisms 54 and 56 are located in zone II; torque-transmitting mechanisms 57 and 58 are disposed in zone III; and torque-transmitting mechanisms 50 and 52 are disposed in zone V. Alternatively, the interconnections between the various gear members, the input member 12, the output member 14 and the housing 80 obtained by selective engagement of the various torque-transmitting mechanism as described above are possible with the torque-transmitting mechanisms 50, 52, 54, 56, 57 and 58 disposed in other zones as shown in the chart of FIG. 1B. An "X" in the chart of FIG. 1B shown below indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 1B is feasible independently of the other rows. Accordingly, torque-transmitting mechanism 50 is locatable in any of four possible zones; torque-transmitting mechanism 52 is locatable in any of four possible zones; torque-transmitting mechanism 54 is locatable in any of three possible zones; torque transmitting mechanism 56 is locatable in any of three possible zones; torque-transmitting mechanism 57 is locatable in any of two possible zones; and torque-transmitting mechanism 58 is locatable in any of three possible zones.

Figures 2A, 2B:
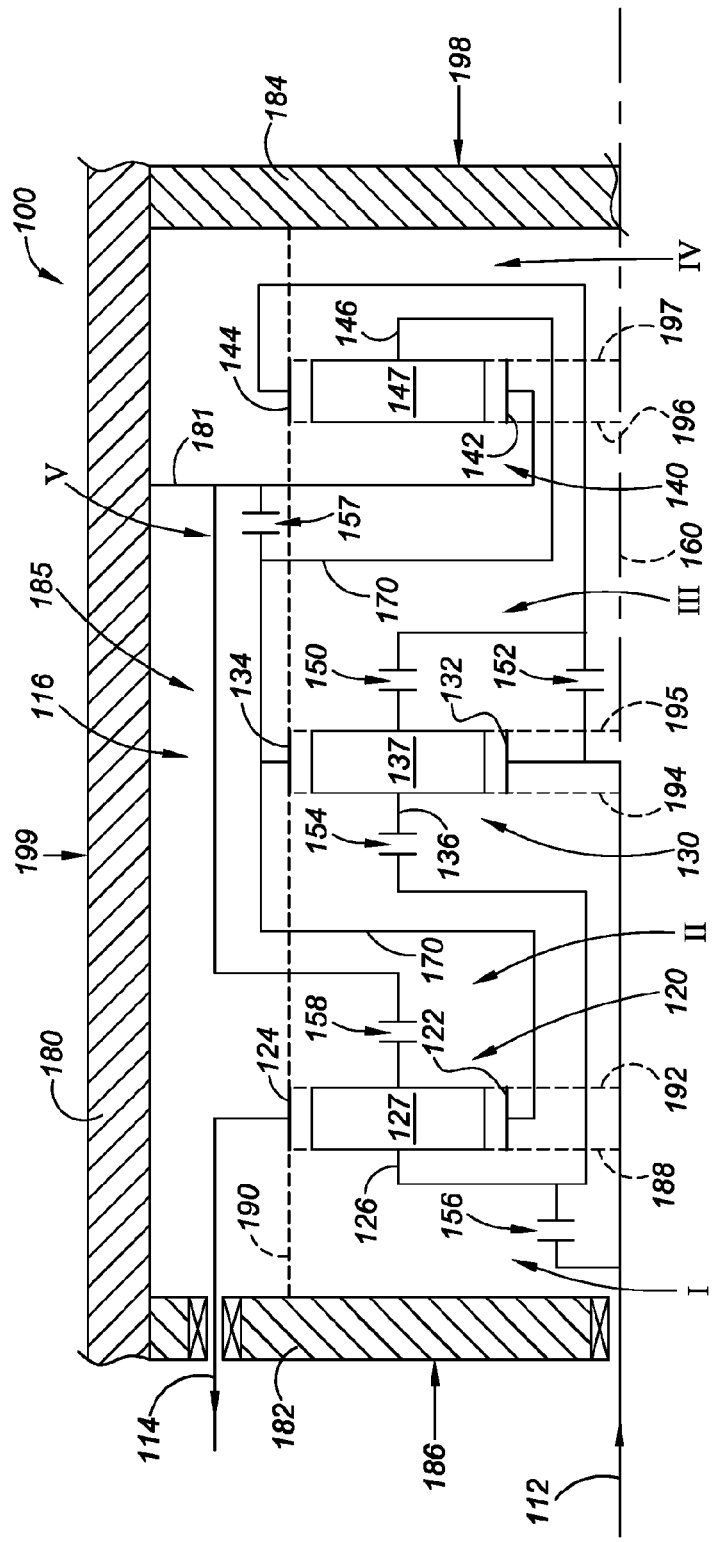
FIG. 2A is a schematic, cross-sectional, partially fragmentary illustration of a second embodiment of a multi-speed transmission within the scope of the invention.
FIG. 2B is a chart listing the selected zones of the transmission casing of the transmission of FIG. 2A in which various torque-transmitting mechanisms may be located.

A second embodiment of a transmission 100 within the scope of the invention is shown in FIG. 2A. Transmission 100 has an input member 112 for receiving power from a power source such as an internal combustion engine and output member 114 for delivering power to a final drive mechanism such as the wheels of a vehicle. Both the input member 112 and the output member 114 extend through a first end wall 182 of the transmission 100.

The transmission 100 includes a gearing arrangement 116 having three planetary gear sets 120, 130 and 140 and six selectively engagable torque-transmitting mechanisms 150, 152, 154, 156, 157 and 158. In the embodiment of FIG. 2A, planetary gear set 140 is the first planetary gear set, planetary gear set 120 is the second planetary gear set, and planetary gear set 130 is the third planetary gear set.

Each planetary gear set 120, 130 and 140 includes rotatable components concentric with a centerline 160 of the transmission 100. Specifically, planetary gear set 120 includes a sun gear member 122, a ring gear member 124 and a carrier member 126 that rotatably supports a plurality of pinion gears 127 that intermesh with both the sun gear member 122 and the ring gear member 124. Planetary gear set 130 includes a sun gear member 132, a ring gear member 134 and a carrier member 136 that rotatably supports a plurality of pinion gears 137 that intermesh with both the sun gear member 132 and the ring gear member 134. Planetary gear set 140 includes a sun gear member 142, a ring gear member 144 and a carrier member 146 that rotatably supports a plurality of pinion gears 147 that intermesh with both the sun gear member 142 and the ring gear member 144.

The input member 112 is continuously connected for common rotation with sun gear member 132. The output member 114 is continuously connected for common rotation with ring gear member 124. An interconnecting member 170 continuously interconnects ring gear member 134 with carrier member 146 and sun gear member 122. The interconnecting member 170 may be one component or multiple components. The sun gear member 142 is continuously grounded to a housing 180 of the transmission 100 via a radially-extending structural member 181. The housing 180 circumferentially surrounds the gear sets 120, 130 and 140 as well as the torque-transmitting mechanisms 150, 152, 154, 156, 157 and 158. The transmission 100 further includes a first end wall 182 generally at one end of the transmission 100 and a second end wall 184 generally at an opposing end of the transmission 100. The housing 180 joins the first and second end walls 182, 184. It should be appreciated that the housing 180 and the first and second end walls 182, 184 form a transmission casing, and may be integrated, or may each be a separate component or components of the casing. The transmission casing may be referred to herein as 180, 182, 184. The transmission casing 180, 182, 184 defines a cavity 185. The end walls 182 and 184 enclose the cavity 185 axially, but are likely a conical or irregular shape rather than a planar shape as schematically depicted.

The planetary gear sets 120, 130, and 140 and torque-transmitting mechanisms 150, 152, 154, 156, 157, and 158 are located in the cavity 185. The housing 180, end walls 182 and 184 and the planetary gear sets 120, 130 and 140 cooperate to define five spaces or zones within the cavity 185. A first zone I is defined between an outer surface 186 of the first end wall 182 and a plane 188 running generally parallel with a side of the planetary gear set 120 adjacent the first end wall 182, and runs radially outward to a circumferential boundary 190 running along a radially-outermost periphery of each of the ring gear members 124, 134 and 144. A second zone II is defined between a plane 192 running generally parallel along a side of the planetary gear set 120 facing the planetary gear set 130, a plane 194 running generally parallel along a side of the planetary gear set 130 facing the planetary gear set 120 and the circumferential boundary 190. A third zone III is defined between a plane 195 running generally parallel along a side of the planetary gear set 130 facing the planetary gear set 140, a plane 196 running generally parallel along a side of the planetary gear set 140 facing the planetary gear set 130 and the circumferential boundary 190. A fourth zone IV is defined between a plane 197 running generally parallel along a side of the planetary gear set 140 facing the second end wall 184, an outer surface 198 of the second end wall 184 and the circumferential boundary 190. A fifth zone V is defined between the circumferential boundary 190, an outer surface 199 of the housing 180, and the outer surfaces 186 and 198 of the first and second end walls 182 and 184, respectively. The structural member 181 traverses zones III and V.

Torque-transmitting mechanisms 150, 152, 154, and 156 are rotating-type clutches and torque-transmitting mechanisms 157 and 158 are brakes, also referred to as reaction clutches. Torque-transmitting mechanism 150 is selectively engagable to connect the carrier member 136 for common rotation with the ring gear member 144. The torque-transmitting mechanism 152 is selectively engagable to connect the input member 112 and the sun gear member 132 for common rotation with the ring gear member 144. The torque-transmitting mechanism 154 is selectively engagable to connect the carrier member 126 for common rotation with the carrier member 136. The torque-transmitting mechanism 156 is selectively engagable to connect the input member 112 and the sun gear member 132 for common rotation with the carrier member 126. The torque-transmitting mechanism 157 is selectively engagable to ground the carrier member 146 (as well as the sun gear member 122 and ring gear member 134) to the transmission housing 180 via the structural member 181. The torque-transmitting mechanism 158 is selectively engagable to ground the carrier member 126 to the transmission housing 180 via the structural member 181.

The transmission 100 provides eight forward speed ratios and one reverse speed ratio between the input member 112 and the output member 114. Specifically, a reverse speed ratio is established by engaging torque-transmitting mechanisms 152 and 158; a first forward speed ratio is established by engaging torque-transmitting mechanisms 154 and 158; a second forward speed ratio is established by engaging torque-transmitting mechanisms 154 and 157; a third forward speed ratio is established by engaging torque-transmitting mechanisms 150 and 154; a fourth forward speed ratio is established by engaging torque-transmitting mechanisms 152 and 154; a fifth forward speed ratio is established by engaging torque-transmitting mechanisms 154 and 156; a sixth forward speed ratio is established by engaging torque-transmitting mechanisms 152 and 156; a seventh forward speed ratio is established by engaging torque-transmitting mechanisms 150 and 156; and an eighth forward speed ratio is established by engaging torque-transmitting mechanisms 156 and 157.

As shown in FIG. 2A, torque-transmitting mechanism 156 is located in zone I; torque-transmitting mechanisms 154 and 158 are located in zone II; torque-transmitting mechanisms 150 and 152 are disposed in zone III; and torque-transmitting mechanism 157 is disposed in zone V. Alternatively, the interconnections between the various gear members, the input member 112, the output member 114 and the housing 180 obtained by selective engagement of the various torque-transmitting mechanism as described above are possible with the torque-transmitting mechanisms 150, 152, 154, 156, 157 and 158 disposed in other zones as shown in the chart II of FIG. 2B. An "X" in the chart of FIG. 2B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 2B is feasible independently of the other rows. Accordingly, torque-transmitting mechanism 150 is locatable in any of three possible zones; torque-transmitting mechanism 152 is locatable in any of four possible zones; torque-transmitting mechanism 154 is locatable in any of three possible zones; torque transmitting mechanism 156 is locatable in any of three possible zones; torque-transmitting mechanism 157 is locatable in any of three possible zones; and torque-transmitting mechanism 158 is locatable in any of four possible zones.

Figures 3A, 3B:
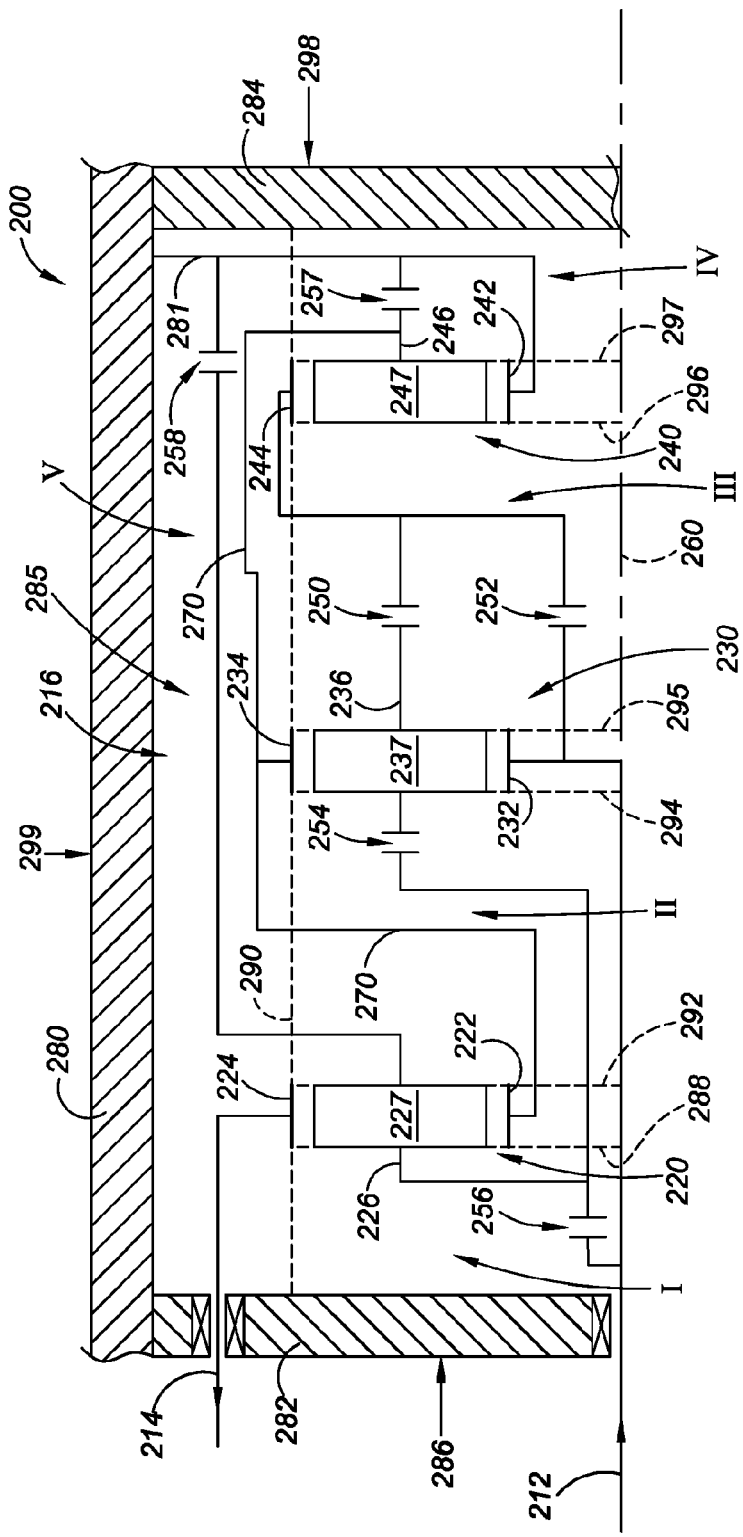
FIG. 3A is a schematic, cross-sectional, partially fragmentary illustration of a third embodiment of a multi-speed transmission within the scope of the invention.
FIG. 3B is a chart listing the selected zones of the transmission casing of the transmission of FIG. 3A in which various torque-transmitting mechanisms may be located.

A third embodiment of a transmission 200 within the scope of the invention is shown in FIG. 3A. Transmission 200 has an input member 212 for receiving power from a power source such as an internal combustion engine and output member 214 for delivering power to a final drive mechanism such as the wheels of a vehicle. Both the input member 212 and the output member 214 extend through a first end wall 282 of the transmission 200.

The transmission 200 includes a gearing arrangement 216 having three planetary gear sets 220, 230 and 240 and six selectively engagable torque-transmitting mechanisms 250, 252, 254, 256, 257 and 258. In the embodiment of FIG. 3A, planetary gear set 240 is the first planetary gear set, planetary gear set 220 is the second planetary gear set, and planetary gear set 230 is the third planetary gear set.

Each planetary gear set 220, 230 and 240 includes rotatable components concentric with a centerline 260 of the transmission 200. Specifically, planetary gear set 220 includes a sun gear member 222, a ring gear member 224 and a carrier member 226 that rotatably supports a plurality of pinion gears 227 that intermesh with both the sun gear member 222 and the ring gear member 224. Planetary gear set 230 includes a sun gear member 232, a ring gear member 234 and a carrier member 236 that rotatably supports a plurality of pinion gears 237 that intermesh with both the sun gear member 232 and the ring gear member 234. Planetary gear set 240 includes a sun gear member 242, a ring gear member 244 and a carrier member 246 that rotatably supports a plurality of pinion gears 247 that intermesh with both the sun gear member 242 and the ring gear member 244.

The input member 212 is continuously connected for common rotation with sun gear member 232. The output member 214 is continuously connected for common rotation with ring gear member 224. An interconnecting member 270 continuously interconnects ring gear member 234 with carrier member 246 and sun gear member 222. The interconnecting member 270 may be one component or multiple components. The sun gear member 242 is continuously grounded to a housing 280 of the transmission 200 via a radially-extending structural member 281. The housing 280 circumferentially surrounds the gear sets 220, 230 and 240 as well as the torque-transmitting mechanisms 250, 252, 254, 256, 257 and 258. The transmission 200 further includes a first end wall 282 generally at one end of the transmission 200 and a second end wall 284 generally at an opposing end of the transmission 200. The housing 280 joins the first and second end walls 282, 284. It should be appreciated that the housing 280 and the first and second end walls 282, 284 form a transmission casing, and may be integrated, or may each be a separate component or components of the casing. The transmission casing may be referred to herein as 280, 282, 284. The transmission casing 280, 282, 284 defines a cavity 285. The end walls 282 and 284 enclose the cavity 285 axially, but are likely a conical or irregular shape rather than a planar shape as schematically depicted.

The planetary gear sets 220, 230, and 240 and torque-transmitting mechanisms 250, 252, 254, 256, 257, and 258 are located in the cavity 285. The housing 280, end walls 282 and 284 and the planetary gear sets 220, 230 and 240 cooperate to define five spaces or zones within the cavity 285. A first zone I is defined between an outer surface 286 of the first end wall 282 and a plane 288 running generally parallel with a side of the planetary gear set 220 adjacent the first end wall 282, and runs radially outward to a circumferential boundary 290 running along a radially-outermost periphery of each of the ring gear members 224, 234 and 244. A second zone II is defined between a plane 292 running generally parallel along a side of the planetary gear set 220 facing the planetary gear set 230, a plane 294 running generally parallel along a side of the planetary gear set 230 facing the planetary gear set 220 and the circumferential boundary 290. A third zone III is defined between a plane 295 running generally parallel along a side of the planetary gear set 230 facing the planetary gear set 240, a plane 296 running generally parallel along a side of the planetary gear set 240 facing the planetary gear set 230 and the circumferential boundary 290. A fourth zone IV is defined between a plane 297 running generally parallel along a side of the planetary gear set 240 facing the second end wall 284, an outer surface 298 of the second end wall 284 and the circumferential boundary 290. A fifth zone V is defined between the circumferential boundary 290, an outer surface 299 of the housing 280, and the outer surfaces 286 and 298 of the first and second end walls 282 and 284, respectively. The structural member 281 traverses zones IV and V.

Torque-transmitting mechanisms 250, 252, 254, and 2156 are rotating-type clutches and torque-transmitting mechanisms 257 and 258 are brakes, also referred to as reaction clutches. Torque-transmitting mechanism 250 is selectively engagable to connect the carrier member 236 for common rotation with the ring gear member 244. The torque-transmitting mechanism 252 is selectively engagable to connect the input member 212 and the sun gear member 232 for common rotation with the ring gear member 244. The torque-transmitting mechanism 254 is selectively engagable to connect the carrier member 226 for common rotation with the carrier member 236. The torque-transmitting mechanism 256 is selectively engagable to connect the input member 212 and the sun gear member 232 for common rotation with the carrier member 226. The torque-transmitting mechanism 257 is selectively engagable to ground the carrier member 246 (as well as the sun gear member 222 and ring gear member 234) to the transmission housing 280 via the structural member 281. The torque-transmitting mechanism 258 is selectively engagable to ground the carrier member 226 to the transmission housing 280 via the structural member 281.

The transmission 200 provides eight forward speed ratios and one reverse speed ratio between the input member 212 and the output member 214. Specifically, a reverse speed ratio is established by engaging torque-transmitting mechanisms 252 and 258; a first forward speed ratio is established by engaging torque-transmitting mechanisms 254 and 258; a second forward speed ratio is established by engaging torque-transmitting mechanisms 254 and 257; a third forward speed ratio is established by engaging torque-transmitting mechanisms 250 and 254; a fourth forward speed ratio is established by engaging torque-transmitting mechanisms 252 and 254; a fifth forward speed ratio is established by engaging torque-transmitting mechanisms 254 and 256; a sixth forward speed ratio is established by engaging torque-transmitting mechanisms 252 and 256; a seventh forward speed ratio is established by engaging torque-transmitting mechanisms 250 and 256; and an eighth forward speed ratio is established by engaging torque-transmitting mechanisms 256 and 257.

As shown in FIG. 3A, torque-transmitting mechanism 256 is located in zone I; torque-transmitting mechanism 254 is located in zone II; torque-transmitting mechanisms 250 and 252 are disposed in zone III; torque-transmitting mechanism 257 is disposed in zone IV; and torque-transmitting mechanism 258 is disposed in zone V. Alternatively, the interconnections between the various gear members, the input member 212, the output member 214 and the housing 280 obtained by selective engagement of the various torque-transmitting mechanism as described above are possible with the torque-transmitting mechanisms 250, 252, 254, 256, 257 and 258 disposed in other zones as shown in the chart of FIG. 3B. An "X" in the chart of FIG. 3B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 3B is feasible independently of the other rows. Accordingly, torque-transmitting mechanism 250 is locatable in any of three possible zones; torque-transmitting mechanism 252 is locatable if any of two possible zones; torque-transmitting mechanism 254 is locatable in any of three possible zones; torque transmitting mechanism 256 is locatable in any of three possible zones; torque-transmitting mechanism 257 is locatable in any of four possible zones; and torque-transmitting mechanism 258 is locatable in any of four possible zones.

Figures 4A, 4B:
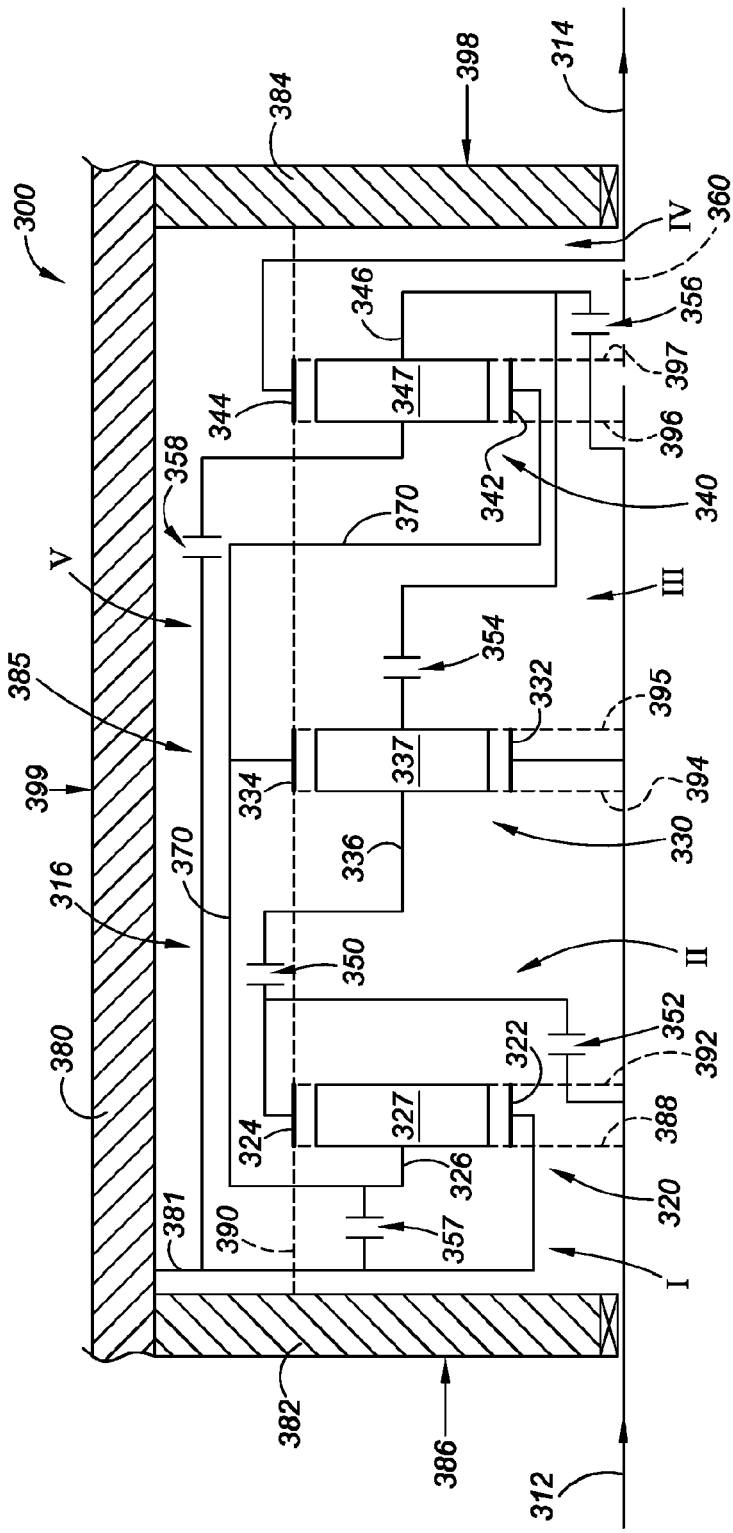
FIG. 4A is a schematic, cross-sectional, partially fragmentary illustration of a fourth embodiment of a multi-speed transmission within the scope of the invention.
FIG. 4B is a chart listing the selected zones of the transmission casing of the transmission of FIG. 4A in which various torque-transmitting mechanisms may be located.

A fourth embodiment of a transmission 300 within the scope of the invention is shown in FIG. 4A. Transmission 300 has an input member 312 for receiving power from a power source such as an internal combustion engine and output member 314 for delivering power to a final drive mechanism such as the wheels of a vehicle.

The transmission 300 includes a gearing arrangement 316 having three planetary gear sets 320, 330 and 340 and six selectively engagable torque-transmitting mechanisms 350, 352, 354, 356, 357 and 358. In the embodiment of FIG. 4A, planetary gear set 320 is the first planetary gear set, planetary gear set 340 is the second planetary gear set, and planetary gear set 330 is the third planetary gear set.

Each planetary gear set 320, 330 and 340 includes rotatable components concentric with a centerline 360 of the transmission 300. Specifically, planetary gear set 320 includes a sun gear member 322, a ring gear member 324 and a carrier member 326 that rotatably supports a plurality of pinion gears 327 that intermesh with both the sun gear member 322 and the ring gear member 324. Planetary gear set 330 includes a sun gear member 332, a ring gear member 334 and a carrier member 336 that rotatably supports a plurality of pinion gears 337 that intermesh with both the sun gear member 332 and the ring gear member 334. Planetary gear set 340 includes a sun gear member 342, a ring gear member 344 and a carrier member 346 that rotatably supports a plurality of pinion gears 347 that intermesh with both the sun gear member 342 and the ring gear member 344.

The input member 312 is continuously connected for common rotation with sun gear member 332. The output member 314 is continuously connected for common rotation with ring gear member 344. An interconnecting member 370 continuously interconnects ring gear member 334 with carrier member 326 and sun gear member 342. The interconnecting member 370 may be one component or multiple components. The sun gear member 322 is continuously grounded to a housing 380 of the transmission 300 via a radially-extending structural member 381. The housing 380 circumferentially surrounds the gear sets 320, 330 and 340 as well as the torque-transmitting mechanisms 350, 352, 354, 356, 357 and 358. The transmission 300 further includes a first end wall 382 generally at one end of the transmission 300 and a second end wall 384 generally at an opposing end of the transmission 300. The housing 380 joins the first and second end walls 382, 384. It should be appreciated that the housing 380 and the first and second end walls 382, 384 form a transmission casing, and may be integrated, or may each be a separate component or components of the casing. The transmission casing may be referred to herein as 380, 382, 384. The transmission casing 380, 382, 384 defines a cavity 385. The end walls 382 and 384 enclose the cavity 385 axially, but are likely a conical or irregular shape rather than a planar shape as schematically depicted.

The planetary gear sets 320, 330, and 340 and torque-transmitting mechanisms 350, 352, 354, 356, 357, and 358 are located in the cavity 385. The housing 380, end walls 382 and 384 and the planetary gear sets 320, 330 and 340 cooperate to define five spaces or zones within the cavity 385. A first zone I is defined between an outer surface 386 of the first end wall 382 and a plane 388 running generally parallel with a side of the planetary gear set 320 adjacent the first end wall 382, and runs radially outward to a circumferential boundary 390 running along a radially-outermost surface of each of the ring gear members 324, 334 and 344. A second zone II is defined between a plane 392 running generally parallel along a side of the planetary gear set 320 facing the planetary gear set 330, a plane 394 running generally parallel along a side of the planetary gear set 330 facing the planetary gear set 320 and the circumferential boundary 390. A third zone III is defined between a plane 395 running generally parallel along a side of the planetary gear set 330 facing the planetary gear set 340, a plane 396 running generally parallel along a side of the planetary gear set 340 facing the planetary gear set 330 and the circumferential boundary 390. A fourth zone IV is defined between a plane 397 running generally parallel along a side of the planetary gear set 340 facing the second end wall 384, an outer surface 398 of the second end wall 384 and the circumferential boundary 390. A fifth zone V is defined between the circumferential boundary 390, an outer surface 399 of the housing 380, and the outer surfaces 386 and 398 of the first and second end walls 382 and 384, respectively. The structural member 381 traverses zones I and V.

Torque-transmitting mechanisms 350, 352, 354, and 356 are rotating-type clutches and torque-transmitting mechanisms 357 and 358 are brakes, also referred to as reaction clutches. Torque-transmitting mechanism 350 is selectively engagable to connect the carrier member 336 for common rotation with the ring gear member 324. The torque-transmitting mechanism 352 is selectively engagable to connect the input member 312 and the sun gear member 332 for common rotation with the ring gear member 324. The torque-transmitting mechanism 354 is selectively engagable to connect the carrier member 336 for common rotation with the carrier member 346. The torque-transmitting mechanism 356 is selectively engagable to connect the input member 312 and the sun gear member 332 for common rotation with the carrier member 346. The torque-transmitting mechanism 357 is selectively engagable to ground the carrier member 326 (as well as the sun gear member 342 and ring gear member 334) to the transmission housing 380 via the structural member 381. The torque-transmitting mechanism 358 is selectively engagable to ground the carrier member 346 to the transmission housing 380 via the structural member 381.

The transmission 300 provides eight forward speed ratios and one reverse speed ratio between the input member 312 and the output member 314. Specifically, a reverse speed ratio is established by engaging torque-transmitting mechanisms 352 and 358; a first forward speed ratio is established by engaging torque-transmitting mechanisms 354 and 358; a second forward speed ratio is established by engaging torque-transmitting mechanisms 354 and 357; a third forward speed ratio is established by engaging torque-transmitting mechanisms 350 and 354; a fourth forward speed ratio is established by engaging torque-transmitting mechanisms 352 and 354; a fifth forward speed ratio is established by engaging torque-transmitting mechanisms 354 and 356; a sixth forward speed ratio is established by engaging torque-transmitting mechanisms 352 and 356; a seventh forward speed ratio is established by engaging torque-transmitting mechanisms 350 and 356; and an eighth forward speed ratio is established by engaging torque-transmitting mechanisms 356 and 357.

As shown in FIG. 4A, torque-transmitting mechanism 357 is located in zone I; torque-transmitting mechanism 352 is located in zone II; torque-transmitting mechanism 354 is disposed in zone III; torque-transmitting mechanism 356 is disposed in zone IV; and torque-transmitting mechanisms 350 and 358 are disposed in zone V. Alternatively, the interconnections between the various gear members, the input member 312, the output member 314 and the housing 380 obtained by selective engagement of the various torque-transmitting mechanism as described above are possible with the torque-transmitting mechanisms 350, 352, 354, 356, 357 and 358 disposed in other zones as shown in the chart of FIG. 4B. An "X" in the chart of FIG. 4B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 4B is feasible independently of the other rows. Accordingly, torque-transmitting mechanism 350 is locatable in any of three possible zones; torque-transmitting mechanism 352 is locatable if any of three possible zones; torque-transmitting mechanism 354 is locatable in any of two possible zones; torque transmitting mechanism 356 is locatable in any of two possible zones; torque-transmitting mechanism 357 is locatable in any of four possible zones; and torque-transmitting mechanism 358 is locatable in any of the five possible zones.

Figures 5A, 5B:
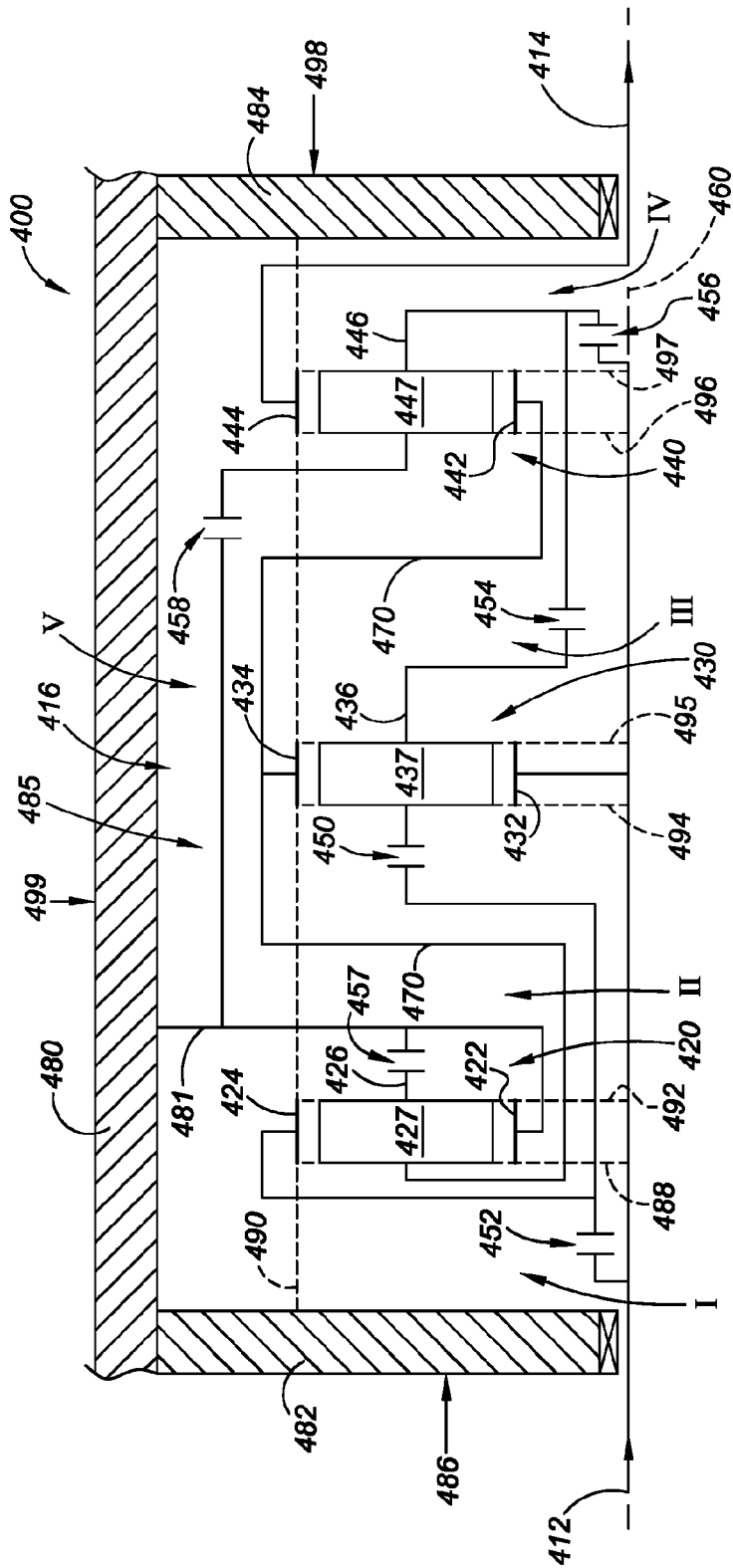
FIG. 5A is a schematic, cross-sectional, partially fragmentary illustration of a fifth embodiment of a multi-speed transmission within the scope of the invention.
FIG. 5B is a chart listing the selected zones of the transmission casing of the transmission of FIG. 5A in which various torque-transmitting mechanisms may be located.

A fifth embodiment of a transmission 400 within the scope of the invention is shown in FIG. 5A. Transmission 400 has an input member 412 for receiving power from a power source such as an internal combustion engine and output member 414 for delivering power to a final drive mechanism such as the wheels of a vehicle.

The transmission 400 includes a gearing arrangement 416 having three planetary gear sets 420, 430 and 440 and six selectively engagable torque-transmitting mechanisms 450, 452, 454, 456, 457 and 458. In the embodiment of FIG. 5A, planetary gear set 420 is the first planetary gear set, planetary gear set 440 is the second planetary gear set, and planetary gear set 430 is the third planetary gear set.

Each planetary gear set 420, 430 and 440 includes rotatable components concentric with a centerline 460 of the transmission 400. Specifically, planetary gear set 420 includes a sun gear member 422, a ring gear member 424 and a carrier member 426 that rotatably supports a plurality of pinion gears 427 that intermesh with both the sun gear member 422 and the ring gear member 424. Planetary gear set 430 includes a sun gear member 432, a ring gear member 434 and a carrier member 436 that rotatably supports a plurality of pinion gears 437 that intermesh with both the sun gear member 432 and the ring gear member 434. Planetary gear set 440 includes a sun gear member 442, a ring gear member 444 and a carrier member 446 that rotatably supports a plurality of pinion gears 447 that intermesh with both the sun gear member 442 and the ring gear member 444.

The input member 412 is continuously connected for common rotation with sun gear member 432. The output member 414 is continuously connected for common rotation with ring gear member 444. An interconnecting member 470 continuously interconnects ring gear member 434 with carrier member 426 and sun gear member 442. The interconnecting member 470 may be one component or multiple components. The sun gear member 422 is continuously grounded to a housing 480 of the transmission 400 via a radially-extending structural member 481. The housing 480 circumferentially surrounds the gear sets 420, 430 and 440 as well as the torque-transmitting mechanisms 450, 452, 454, 456, 457 and 458. The transmission 400 further includes a first end wall 482 generally at one end of the transmission 400 and a second end wall 484 generally at an opposing end of the transmission 400. The housing 480 joins the first and second end walls 482, 484. It should be appreciated that the housing 480 and the first and second end walls 482, 484 form a transmission casing, and may be integrated, or may each be a separate component or components of the casing. The transmission casing may be referred to herein as 480, 482, 484. The transmission casing 480, 482, 484 defines a cavity 485. The end walls 482 and 484 enclose the cavity 485 axially, but are likely a conical or irregular shape rather than a planar shape as schematically depicted.

The planetary gear sets 420, 430, and 440 and torque-transmitting mechanisms 450, 452, 454, 456, 457, and 458 are located in the cavity 485. The housing 480, end walls 482 and 484 and the planetary gear sets 420, 430 and 440 cooperate to define five spaces or zones within the cavity 485. A first zone I is defined between an outer surface 486 of the first end wall 482 and a plane 488 running generally parallel with a side of the planetary gear set 420 adjacent the first end wall 482, and runs radially outward to a circumferential boundary 490 running along a radially-outermost periphery of each of the ring gear members 424, 434 and 444. A second zone II is defined between a plane 492 running generally parallel along a side of the planetary gear set 420 facing the planetary gear set 430, a plane 494 running generally parallel along a side of the planetary gear set 430 facing the planetary gear set 420 and the circumferential boundary 490. A third zone III is defined between a plane 495 running generally parallel along a side of the planetary gear set 430 facing the planetary gear set 440, a plane 496 running generally parallel along a side of the planetary gear set 440 facing the planetary gear set 430 and the circumferential boundary 490. A fourth zone IV is defined between a plane 497 running generally parallel along a side of the planetary gear set 440 facing the second end wall 484, an outer surface 498 of the second end wall 484 and the circumferential boundary 490. A fifth zone V is defined between the circumferential boundary 490, an outer surface 499 of the housing 480, and the outer surfaces 486 and 498 of the first and second end walls 482 and 484, respectively. The structural member 481 traverses zones II and V.

Torque-transmitting mechanisms 450, 452, 454, and 456 are rotating-type clutches and torque-transmitting mechanisms 457 and 458 are brakes, also referred to as reaction clutches. Torque-transmitting mechanism 450 is selectively engagable to connect the carrier member 436 for common rotation with the ring gear member 424. The torque-transmitting mechanism 452 is selectively engagable to connect the input member 412 and the sun gear member 432 for common rotation with the ring gear member 424. The torque-transmitting mechanism 454 is selectively engagable to connect the carrier member 436 for common rotation with the carrier member 446. The torque-transmitting mechanism 456 is selectively engagable to connect the input member 412 and the sun gear member 432 for common rotation with the carrier member 446. The torque-transmitting mechanism 457 is selectively engagable to ground the carrier member 426 (as well as the sun gear member 442 and ring gear member 434) to the transmission housing 480 via the structural member 481. The torque-transmitting mechanism 458 is selectively engagable to ground the carrier member 446 to the transmission housing 480 via the structural member 481.

The transmission 400 provides eight forward speed ratios and one reverse speed ratio between the input member 412 and the output member 414. Specifically, a reverse speed ratio is established by engaging torque-transmitting mechanisms 452 and 458; a first forward speed ratio is established by engaging torque-transmitting mechanisms 454 and 458; a second forward speed ratio is established by engaging torque-transmitting mechanisms 454 and 457; a third forward speed ratio is established by engaging torque-transmitting mechanisms 450 and 454; a fourth forward speed ratio is established by engaging torque-transmitting mechanisms 452 and 454; a fifth forward speed ratio is established by engaging torque-transmitting mechanisms 454 and 456; a sixth forward speed ratio is established by engaging torque-transmitting mechanisms 452 and 456; a seventh forward speed ratio is established by engaging torque-transmitting mechanisms 450 and 456; and an eighth forward speed ratio is established by engaging torque-transmitting mechanisms 456 and 457.

As shown in FIG. 5A, torque-transmitting mechanism 452 is located in zone I; torque-transmitting mechanisms 450 and 457 are located in zone II; torque-transmitting mechanism 454 is disposed in zone III; torque-transmitting mechanism 456 is disposed in zone IV; and torque-transmitting mechanism 458 is disposed in zone V. Alternatively, the interconnections between the various gear members, the input member 412, the output member 414 and the housing 480 obtained by selective engagement of the various torque-transmitting mechanism as described above are possible with the torque-transmitting mechanisms 450, 452, 454, 456, 457 and 458 disposed in other zones as shown in the chart of FIG. 5B. An "X" in the chart of FIG. 5B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 5B is feasible independently of the other rows. Accordingly, torque-transmitting mechanism 450 is locatable in any of three possible zones; torque-transmitting mechanism 452 is locatable in any of three possible zones; torque-transmitting mechanism 454 is locatable in any of two possible zones; torque transmitting mechanism 456 is locatable in any of two possible zones; torque-transmitting mechanism 457 is locatable in any of the five possible zones; and torque-transmitting mechanism 458 is locatable in any of four possible zones.

Figures 6A, 6B:
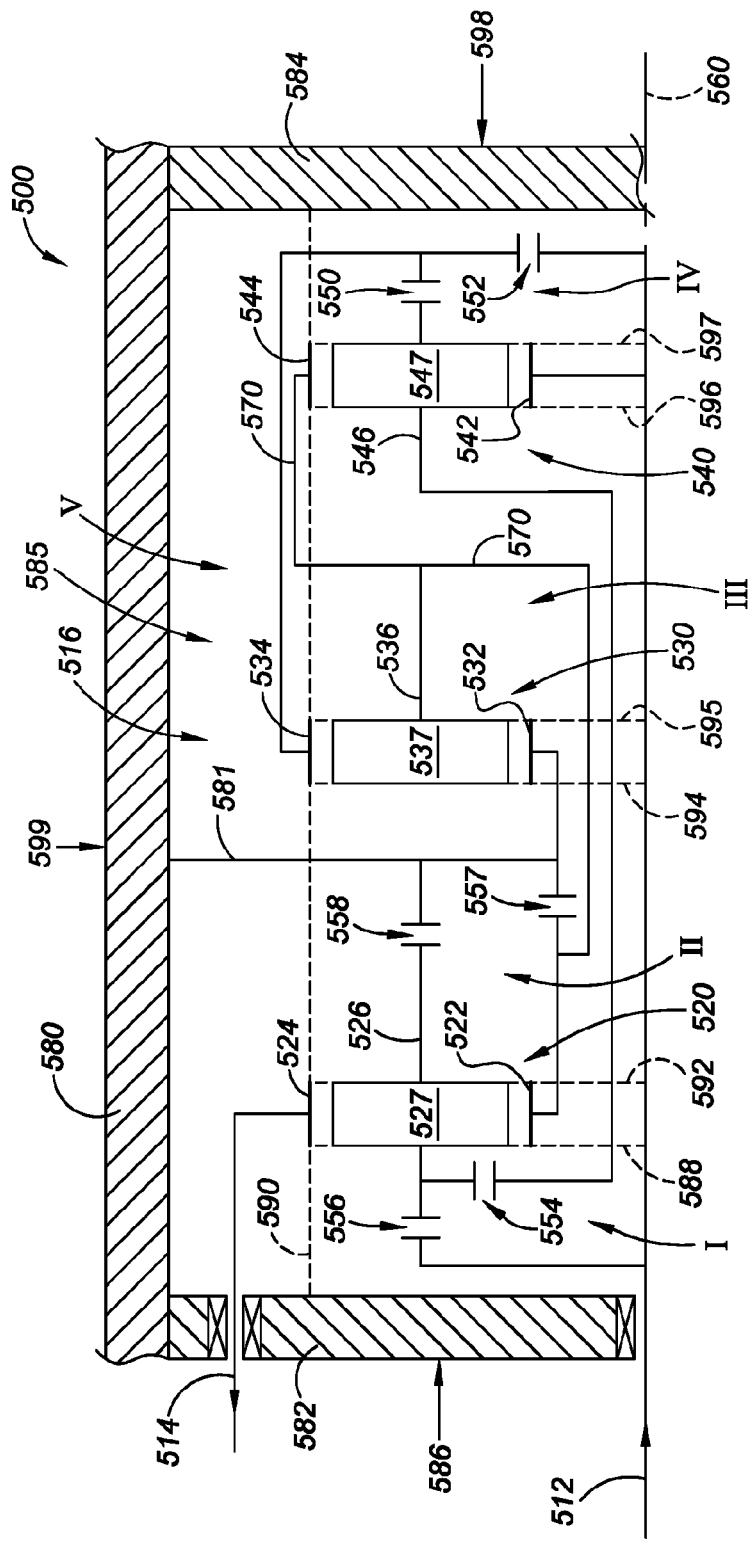
FIG. 6A is a schematic, cross-sectional, partially fragmentary illustration of a sixth embodiment of a multi-speed transmission within the scope of the invention.
FIG. 6B is a chart listing the selected zones of the transmission casing of the transmission of FIG. 6A in which various torque-transmitting mechanisms may be located.

A sixth embodiment of a transmission 500 within the scope of the invention is shown in FIG. 6A. Transmission 500 has an input member 512 for receiving power from a power source such as an internal combustion engine and output member 514 for delivering power to a final drive mechanism such as the wheels of a vehicle. Both the input member 512 and the output member 514 extend through a first end wall 582 of the transmission 500.

The transmission 500 includes a gearing arrangement 516 having three planetary gear sets 520, 530 and 540 and six selectively engagable torque-transmitting mechanisms 550, 552, 554, 556, 557 and 558. In the embodiment of FIG. 6A, planetary gear set 530 is the first planetary gear set, planetary gear set 520 is the second planetary gear set, and planetary gear set 540 is the third planetary gear set.

Each planetary gear set 520, 530 and 540 includes rotatable components concentric with a centerline 560 of the transmission 500. Specifically, planetary gear set 520 includes a sun gear member 522, a ring gear member 524 and a carrier member 526 that rotatably supports a plurality of pinion gears 527 that intermesh with both the sun gear member 522 and the ring gear member 524. Planetary gear set 530 includes a sun gear member 532, a ring gear member 534 and a carrier member 536 that rotatably supports a plurality of pinion gears 537 that intermesh with both the sun gear member 532 and the ring gear member 534. Planetary gear set 540 includes a sun gear member 542, a ring gear member 544 and a carrier member 546 that rotatably supports a plurality of pinion gears 547 that intermesh with both the sun gear member 542 and the ring gear member 544.

The input member 512 is continuously connected for common rotation with sun gear member 542. The output member 514 is continuously connected for common rotation with ring gear member 524. An interconnecting member 570 continuously interconnects ring gear member 544 with carrier member 536 and sun gear member 522. The interconnecting member 570 may be one component or multiple components. The sun gear member 532 is continuously grounded to a housing 580 of the transmission 500 via a radially-extending structural member 581. The housing 580 circumferentially surrounds the gear sets 520, 530 and 540 as well as the torque-transmitting mechanisms 550, 552, 554, 556, 557 and 558. The transmission 500 further includes a first end wall 582 generally at one end of the transmission 500 and a second end wall 584 generally at an opposing end of the transmission 500. The housing 580 joins the first and second end walls 582, 584. It should be appreciated that the housing 580 and the first and second end walls 582, 584 form a transmission casing, and may be integrated, or may each be a separate component or components of the casing. The transmission casing may be referred to herein as 580, 582, 584. The transmission casing 580, 582, 584 defines a cavity 585. The end walls 582 and 584 enclose the cavity 585 axially, but are likely a conical or irregular shape rather than a planar shape as schematically depicted.

The planetary gear sets 520, 530, and 540 and torque-transmitting mechanisms 550, 552, 554, 556, 557, and 558 are located in the cavity 585. The housing 580, end walls 582 and 584 and the planetary gear sets 520, 530 and 540 cooperate to define five spaces or zones within the cavity 585. A first zone I is defined between an outer surface 586 of the first end wall 582 and a plane 588 running generally parallel with a side of the planetary gear set 520 adjacent the first end wall 582, and runs radially outward to a circumferential boundary 590 running along a radially-outermost periphery of each of the ring gear members 524, 534 and 544. A second zone II is defined between a plane 592 running generally parallel along a side of the planetary gear set 520 facing the planetary gear set 530, a plane 594 running generally parallel along a side of the planetary gear set 530 facing the planetary gear set 520 and the circumferential boundary 590. A third zone III is defined between a plane 595 running generally parallel along a side of the planetary gear set 530 facing the planetary gear set 540, a plane 596 running generally parallel along a side of the planetary gear set 540 facing the planetary gear set 530 and the circumferential boundary 590. A fourth zone IV is defined between a plane 597 running generally parallel along a side of the planetary gear set 540 facing the second end wall 584, an outer surface 598 of the second end wall 584 and the circumferential boundary 590. A fifth zone V is defined between the circumferential boundary 590, an outer surface 599 of the housing 580, and the outer surfaces 586 and 598 of the first and second end walls 582 and 584, respectively. The structural member 581 traverses zones II and V.

Torque-transmitting mechanisms 550, 552, 554, and 556 are rotating-type clutches and torque-transmitting mechanisms 557 and 558 are brakes, also referred to as reaction clutches. Torque-transmitting mechanism 550 is selectively engagable to connect the carrier member 546 for common rotation with the ring gear member 534. The torque-transmitting mechanism 552 is selectively engagable to connect the input member 512 and the sun gear member 542 for common rotation with the ring gear member 534. The torque-transmitting mechanism 554 is selectively engagable to connect the carrier member 526 for common rotation with the carrier member 546. The torque-transmitting mechanism 556 is selectively engagable to connect the input member 512 and the sun gear member 542 for common rotation with the carrier member 526. The torque-transmitting mechanism 557 is selectively engagable to ground the carrier member 536 (as well as the sun gear member 522 and ring gear member 544) to the transmission housing 580 via the structural member 581. The torque-transmitting mechanism 558 is selectively engagable to ground the carrier member 526 to the transmission housing 580 via the structural member 581.

The transmission 500 provides eight forward speed ratios and one reverse speed ratio between the input member 512 and the output member 514. Specifically, a reverse speed ratio is established by engaging torque-transmitting mechanisms 552 and 558; a first forward speed ratio is established by engaging torque-transmitting mechanisms 554 and 558; a second forward speed ratio is established by engaging torque-transmitting mechanisms 554 and 557; a third forward speed ratio is established by engaging torque-transmitting mechanisms 550 and 554; a fourth forward speed ratio is established by engaging torque-transmitting mechanisms 552 and 554; a fifth forward speed ratio is established by engaging torque-transmitting mechanisms 554 and 556; a sixth forward speed ratio is established by engaging torque-transmitting mechanisms 552 and 556; a seventh forward speed ratio is established by engaging torque-transmitting mechanisms 550 and 556; and an eighth forward speed ratio is established by engaging torque-transmitting mechanisms 556 and 557.

As shown in FIG. 6A, torque-transmitting mechanisms 554 and 556 are located in zone I; torque-transmitting mechanisms 557 and 558 are located in zone II; and torque-transmitting mechanisms 550 and 552 are disposed in zone IV. Alternatively, the interconnections between the various gear members, the input member 512, the output member 514 and the housing 580 obtained by selective engagement of the various torque-transmitting mechanism as described above are possible with the torque-transmitting mechanisms 550, 552, 554, 556, 557 and 558 disposed in other zones as shown in the chart of FIG. 6B. An "X" in the chart of FIG. 6B below indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 6B is feasible independently of the other rows. Accordingly, torque-transmitting mechanism 550 is locatable in any of four possible zones; torque-transmitting mechanism 552 is locatable if any of four possible zones; torque-transmitting mechanism 554 is locatable in any of three possible zones; torque transmitting mechanism 556 is locatable in any of three possible zones; torque-transmitting mechanism 557 is locatable in any of four possible zones; and torque-transmitting mechanism 558 is locatable in any of three possible zones.

A seventh embodiment of a transmission 600 within the scope of the invention is shown in FIG. 7A. Transmission 600 has an input member 612 for receiving power from a power source such as an internal combustion engine and output member 614 for delivering power to a final drive mechanism such as the wheels of a vehicle.

The transmission 600 includes a gearing arrangement 616 having three planetary gear sets 620, 630 and 640 and six selectively engagable torque-transmitting mechanisms 650, 652, 654, 656, 657 and 658. In the embodiment of FIG. 7A, planetary gear set 620 is the first planetary gear set, planetary gear set 630 is the second planetary gear set, and planetary gear set 640 is the third planetary gear set.

Each planetary gear set 620, 630 and 640 includes rotatable components concentric with a centerline 660 of the transmission 600. Specifically, planetary gear set 620 includes a sun gear member 622, a ring gear member 624 and a carrier member 626 that rotatably supports a plurality of pinion gears 627 that intermesh with both the sun gear member 622 and the ring gear member 624. Planetary gear set 630 includes a sun gear member 632, a ring gear member 634 and a carrier member 636 that rotatably supports a plurality of pinion gears 637 that intermesh with both the sun gear member 632 and the ring gear member 634. Planetary gear set 640 includes a sun gear member 642, a ring gear member 644 and a carrier member 646 that rotatably supports a plurality of pinion gears 647 that intermesh with both the sun gear member 642 and the ring gear member 644.

The input member 612 is continuously connected for common rotation with sun gear member 642. The output member 614 is continuously connected for common rotation with ring gear member 634. An interconnecting member 670 continuously interconnects ring gear member 644 with carrier member 626 and sun gear member 632. The interconnecting member 670 may be one component or multiple components. The sun gear member 622 is continuously grounded to a housing 680 of the transmission 600 via a radially-extending structural member 681. The housing 680 circumferentially surrounds the gear sets 620, 630 and 640 as well as the torque-transmitting mechanisms 650, 652, 654, 656, 657 and 658. The transmission 600 further includes a first end wall 682 generally at one end of the transmission 600 and a second end wall 684 generally at an opposing end of the transmission 600. The housing 680 joins the first and second end walls 682, 684. It should be appreciated that the housing 680 and the first and second end walls 682, 684 form a transmission casing, and may be integrated, or may each be a separate component or components of the casing. The transmission casing may be referred to herein as 680, 682, 684. The transmission casing 680, 682, 684 defines a cavity 685. The end walls 682 and 684 enclose the cavity 685 axially, but are likely a conical or irregular shape rather than a planar shape as schematically depicted.

The planetary gear sets 620, 630, and 640 and torque-transmitting mechanisms 650, 652, 654, 656, 657, and 658 are located in the cavity 685.

The housing 680, end walls 682 and 684 and the planetary gear sets 620, 630 and 640 cooperate to define five spaces or zones in the cavity 685. A first zone I is defined between an outer surface 686 of the first end wall 682 and a plane 688 running generally parallel with a side of the planetary gear set 620 adjacent the first end wall 682, and runs radially outward to a circumferential boundary 690 running along a radially-outermost periphery of each of the ring gear members 624, 634 and 644. A second zone II is defined between a plane 692 running generally parallel along a side of the planetary gear set 620 facing the planetary gear set 630, a plane 694 running generally parallel along a side of the planetary gear set 630 facing the planetary gear set 620 and the circumferential boundary 690. A third zone III is defined between a plane 695 running generally parallel along a side of the planetary gear set 630 facing the planetary gear set 640, a plane 696 running generally parallel along a side of the planetary gear set 640 facing the planetary gear set 630 and the circumferential boundary 690. A fourth zone IV is defined between a plane 697 running generally parallel along a side of the planetary gear set 640 facing the second end wall 684, an outer surface 698 of the second end wall 684 and the circumferential boundary 690. A fifth zone V is defined between the circumferential boundary 690, an outer surface 699 of the housing 680, and the outer surfaces 686 and 698 of the first and second end walls 682 and 684, respectively. The structural member 681 traverses zones I and V.

Torque-transmitting mechanisms 650, 652, 654, and 656 are rotating-type clutches and torque-transmitting mechanisms 657 and 658 are brakes, also referred to as reaction clutches. Torque-transmitting mechanism 650 is selectively engagable to connect the carrier member 646 for common rotation with the ring gear member 624. The torque-transmitting mechanism 652 is selectively engagable to connect the input member 612 and sun gear member 642 for common rotation with the ring gear member 624. The torque-transmitting mechanism 654 is selectively engagable to connect the carrier member 636 for common rotation with the carrier member 646. The torque-transmitting mechanism 656 is selectively engagable to connect the input member 612 and the sun gear member 642 for common rotation with the carrier member 636. The torque-transmitting mechanism 657 is selectively engagable to ground the carrier member 626 (as well as the sun gear member 632 and ring gear member 644) to the transmission housing 680 via the structural member 681. The torque-transmitting mechanism 658 is selectively engagable to ground the carrier member 636 to the transmission housing 680 via the structural member 681.

The transmission 600 provides eight forward speed ratios and one reverse speed ratio between the input member 612 and the output member 614. Specifically, a reverse speed ratio is established by engaging torque-transmitting mechanisms 652 and 658; a first forward speed ratio is established by engaging torque-transmitting mechanisms 654 and 658; a second forward speed ratio is established by engaging torque-transmitting mechanisms 654 and 657; a third forward speed ratio is established by engaging torque-transmitting mechanisms 650 and 654; a fourth forward speed ratio is established by engaging torque-transmitting mechanisms 652 and 654; a fifth forward speed ratio is established by engaging torque-transmitting mechanisms 654 and 656; a sixth forward speed ratio is established by engaging torque-transmitting mechanisms 652 and 656; a seventh forward speed ratio is established by engaging torque-transmitting mechanisms 650 and 656; and an eighth forward speed ratio is established by engaging torque-transmitting mechanisms 656 and 657.

As shown in FIG. 7A, torque-transmitting mechanism 657 is located in zone I; torque-transmitting mechanism 652 is located in zone II; torque-transmitting mechanism 650 is disposed in zone III; torque-transmitting mechanisms 654 and 656 are disposed in zone IV; and torque-transmitting mechanism 658 is disposed in zone V. Alternatively, the interconnections between the various gear members, the input member 612, the output member 614 and the housing 680 obtained by selective engagement of the various torque-transmitting mechanism as described above are possible with the torque-transmitting mechanisms 650, 652, 654, 656, 657 and 658 disposed in other zones as shown in the chart of FIG. 7B. An "X" in the chart of FIG. 7B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 7B is feasible independently of the other rows. Accordingly, torque-transmitting mechanism 650 is locatable in any of three possible zones; torque-transmitting mechanism 652 is locatable if any of three possible zones; torque-transmitting mechanism 654 is locatable in any of three possible zones; torque transmitting mechanism 656 is locatable in any of three possible zones; torque-transmitting mechanism 657 is locatable in any of the three possible zones; and torque-transmitting mechanism 658 is locatable in any of three possible zones.

Figures 8A, 8B:
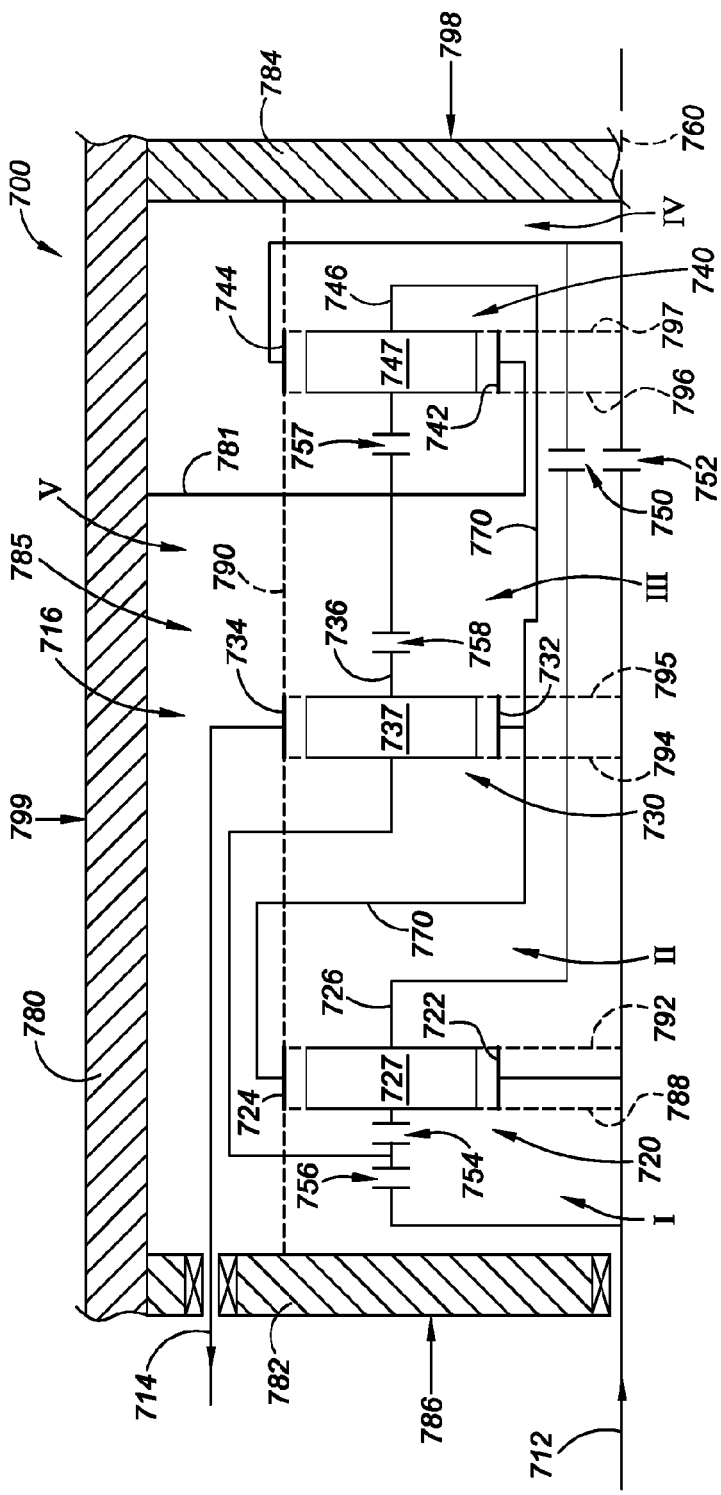
FIG. 8A is a schematic, cross-sectional, partially fragmentary illustration of an eighth embodiment of a multi-speed transmission within the scope of the invention.
FIG. 8B is a chart listing the selected zones of the transmission casing of the transmission of FIG. 8A in which various torque-transmitting mechanisms may be located.

An eighth embodiment of a transmission 700 within the scope of the invention is shown in FIG. 8A. Transmission 700 has an input member 712 for receiving power from a power source such as an internal combustion engine and output member 714 for delivering power to a final drive mechanism such as the wheels of a vehicle. Both the input member 712 and the output member 714 extend through a first end wall 782 of the transmission 700.

The transmission 700 includes a gearing arrangement 716 having three planetary gear sets 720, 730 and 740 and six selectively engagable torque-transmitting mechanisms 750, 752, 754, 756, 757 and 758. In the embodiment of FIG. 8A, planetary gear set 740 is the first planetary gear set, planetary gear set 730 is the second planetary gear set, and planetary gear set 720 is the third planetary gear set.

Each planetary gear set 720, 730 and 740 includes rotatable components concentric with a centerline 760 of the transmission 700. Specifically, planetary gear set 720 includes a sun gear member 722, a ring gear member 724 and a carrier member 726 that rotatably supports a plurality of pinion gears 727 that intermesh with both the sun gear member 722 and the ring gear member 724. Planetary gear set 730 includes a sun gear member 732, a ring gear member 734 and a carrier member 736 that rotatably supports a plurality of pinion gears 737 that intermesh with both the sun gear member 732 and the ring gear member 734. Planetary gear set 740 includes a sun gear member 742, a ring gear member 744 and a carrier member 746 that rotatably supports a plurality of pinion gears 747 that intermesh with both the sun gear member 742 and the ring gear member 744.

The input member 712 is continuously connected for common rotation with sun gear member 722. The output member 714 is continuously connected for common rotation with ring gear member 734. An interconnecting member 770 continuously interconnects ring gear member 724 with carrier member 746 and sun gear member 732. The interconnecting member 770 may be one component or multiple components. The sun gear member 742 is continuously grounded to a housing 780 of the transmission 700 via a radially-extending structural member 781. The housing 780 circumferentially surrounds the gear sets 720, 730 and 740 as well as the torque-transmitting mechanisms 750, 752, 754, 756, 757 and 758. The transmission 700 further includes a first end wall 782 generally at one end of the transmission 700 and a second end wall 784 generally at an opposing end of the transmission 700. The housing 780 joins the first and second end walls 782, 784. It should be appreciated that the housing 80 and the first and second end walls 782, 784 form a transmission casing, and may be integrated, or may each be a separate component or components of the casing. The transmission casing may be referred to herein as 780, 782, 784. The transmission casing 780, 782, 784 defines a cavity 785. The end walls 782 and 784 enclose the cavity 785 axially, but are likely a conical or irregular shape rather than a planar shape as schematically depicted.

The planetary gear sets 720, 730, and 740 and torque-transmitting mechanisms 750, 752, 754, 756, 757, and 758 are located in the cavity 785. The housing 780, end walls 782 and 784 and the planetary gear sets 720, 730 and 740 cooperate to define five spaces or zones in the cavity 785. A first zone I is defined between an outer surface 786 of the first end wall 782 and a plane 788 running generally parallel with a side of the planetary gear set 720 adjacent the first end wall 782, and runs radially outward to a circumferential boundary 790 running along a radially-outermost periphery of each of the ring gear members 724, 734 and 744. A second zone II is defined between a plane 792 running generally parallel along a side of the planetary gear set 720 facing the planetary gear set 730, a plane 794 running generally parallel along a side of the planetary gear set 730 facing the planetary gear set 720 and the circumferential boundary 790. A third zone III is defined between a plane 795 running generally parallel along a side of the planetary gear set 730 facing the planetary gear set 740, a plane 796 running generally parallel along a side of the planetary gear set 740 facing the planetary gear set 530 and the circumferential boundary 790. A fourth zone IV is defined between a plane 797 running generally parallel along a side of the planetary gear set 740 facing the second end wall 784, an outer surface 798 of the second end wall 784 and the circumferential boundary 790. A fifth zone V is defined between the circumferential boundary 790, an outer surface 799 of the housing 780, and the outer surfaces 786 and 798 of the first and second end walls 782 and 784, respectively. The structural member 781 traverses zones III and V.

Torque-transmitting mechanisms 750, 752, 754, and 756 are rotating-type clutches and torque-transmitting mechanisms 757 and 758 are brakes, also referred to as reaction clutches. Torque-transmitting mechanism 750 is selectively engagable to connect the carrier member 726 for common rotation with the ring gear member 744. The torque-transmitting mechanism 752 is selectively engagable to connect the input member 712 and the sun gear member 722 for common rotation with the ring gear member 744. The torque-transmitting mechanism 754 is selectively engagable to connect the carrier member 726 for common rotation with the carrier member 736. The torque-transmitting mechanism 756 is selectively engagable to connect the input member 712 and the sun gear member 722 for common rotation with the carrier member 736. The torque-transmitting mechanism 757 is selectively engagable to ground the carrier member 746 (as well as the sun gear member 732 and ring gear member 724) to the transmission housing 780 via the structural member 781. The torque-transmitting mechanism 758 is selectively engagable to ground the carrier member 736 to the transmission housing 780 via the structural member 781.

The transmission 700 provides eight forward speed ratios and one reverse speed ratio between the input member 712 and the output member 714. Specifically, a reverse speed ratio is established by engaging torque-transmitting mechanisms 752 and 758; a first forward speed ratio is established by engaging torque-transmitting mechanisms 754 and 758; a second forward speed ratio is established by engaging torque-transmitting mechanisms 754 and 757; a third forward speed ratio is established by engaging torque-transmitting mechanisms 750 and 754; a fourth forward speed ratio is established by engaging torque-transmitting mechanisms 752 and 754; a fifth forward speed ratio is established by engaging torque-transmitting mechanisms 754 and 756; a sixth forward speed ratio is established by engaging torque-transmitting mechanisms 752 and 756; a seventh forward speed ratio is established by engaging torque-transmitting mechanisms 750 and 756; and an eighth forward speed ratio is established by engaging torque-transmitting mechanisms 756 and 757.

As shown in FIG. 8A, torque-transmitting mechanisms 754 and 756 are located in zone I; and torque-transmitting mechanisms 750, 752, 757 and 758 are located in zone III. Alternatively, the interconnections between the various gear members, the input member 712, the output member 714 and the housing 780 obtained by selective engagement of the various torque-transmitting mechanism as described above are possible with the torque-transmitting mechanisms 750, 752, 754, 756, 757 and 758 disposed in other zones as shown in the chart of FIG. 8B below. An "X" in the chart of FIG. 8B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 8B is feasible independently of the other rows. Accordingly, torque-transmitting mechanism 750 is locatable in any of three possible zones; torque-transmitting mechanism 752 is locatable if any of three possible zones; torque-transmitting mechanism 754 is locatable in any of three possible zones; torque transmitting mechanism 756 is locatable in any of three possible zones; torque-transmitting mechanism 757 is locatable in any of four possible zones; and torque-transmitting mechanism 758 is locatable in any of three possible zones.

Figures 9A, 9B:
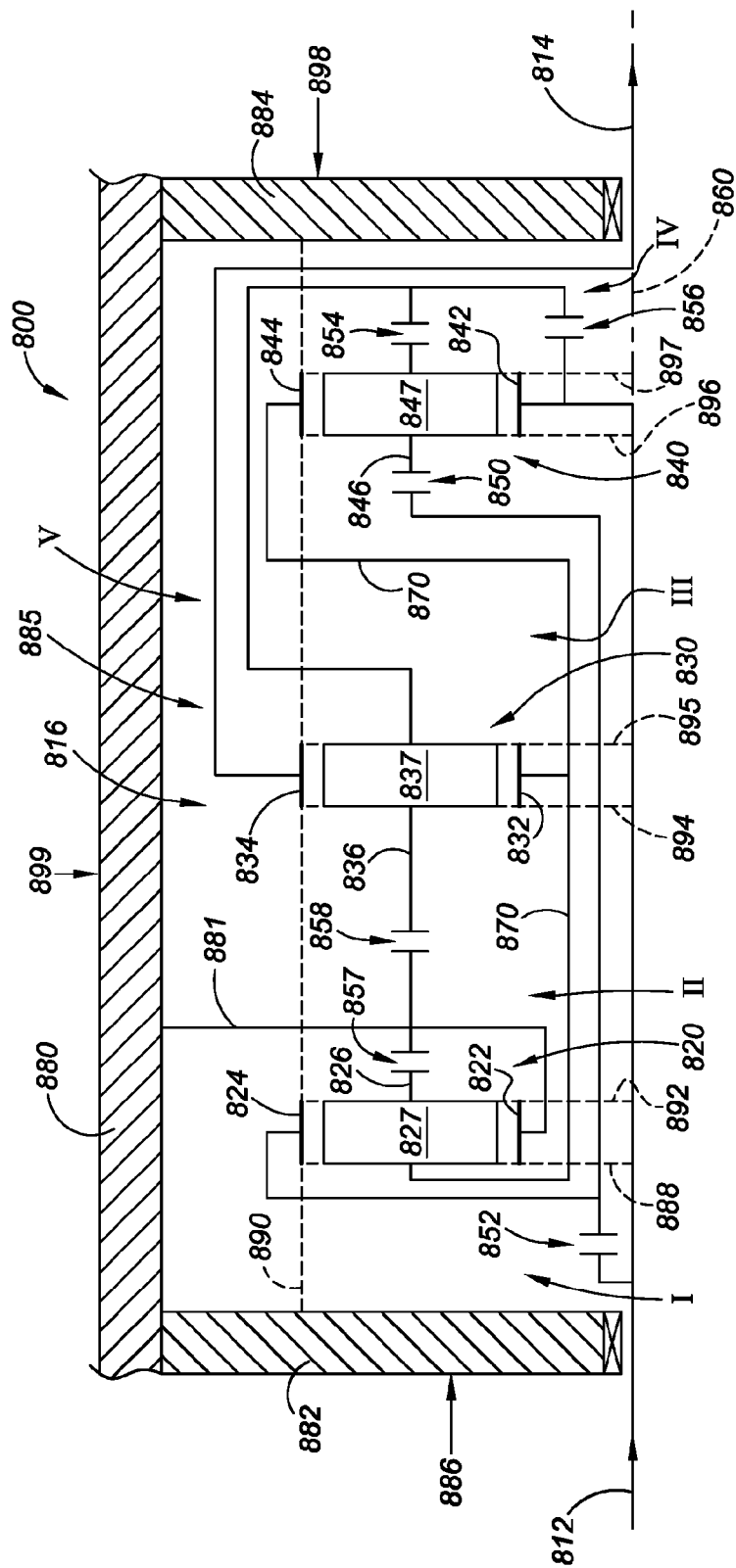
FIG. 9A is a schematic, cross-sectional, partially fragmentary illustration of a ninth embodiment of a multi-speed transmission within the scope of the invention.
FIG. 9B is a chart listing the selected zones of the transmission casing of the transmission of FIG. 9A in which various torque-transmitting mechanisms may be located.

A ninth embodiment of a transmission 800 within the scope of the invention is shown in FIG. 9A. Transmission 800 has an input member 812 for receiving power from a power source such as an internal combustion engine and output member 814 for delivering power to a final drive mechanism such as the wheels of a vehicle.

The transmission 800 includes a gearing arrangement 816 having three planetary gear sets 820, 830 and 840 and six selectively engagable torque-transmitting mechanisms 850, 852, 854, 856, 857 and 858. In the embodiment of FIG. 9A, planetary gear set 820 is the first planetary gear set, planetary gear set 830 is the second planetary gear set, and planetary gear set 840 is the third planetary gear set.

Each planetary gear set 820, 830 and 840 includes rotatable components concentric with a centerline 860 of the transmission 800. Specifically, planetary gear set 820 includes a sun gear member 822, a ring gear member 824 and a carrier member 826 that rotatably supports a plurality of pinion gears 827 that intermesh with both the sun gear member 822 and the ring gear member 824. Planetary gear set 830 includes a sun gear member 832, a ring gear member 834 and a carrier member 836 that rotatably supports a plurality of pinion gears 837 that intermesh with both the sun gear member 832 and the ring gear member 834. Planetary gear set 840 includes a sun gear member 842, a ring gear member 844 and a carrier member 846 that rotatably supports a plurality of pinion gears 847 that intermesh with both the sun gear member 842 and the ring gear member 844.

The input member 812 is continuously connected for common rotation with sun gear member 842. The output member 814 is continuously connected for common rotation with ring gear member 834. An interconnecting member 870 continuously interconnects ring gear member 844 with carrier member 826 and sun gear member 832. The interconnecting member 870 may be one component or multiple components. The sun gear member 822 is continuously grounded to a housing 880 of the transmission 800 via a radially-extending structural member 881. The housing 880 circumferentially surrounds the gear sets 820, 830 and 840 as well as the torque-transmitting mechanisms 850, 852, 854, 856, 857 and 858. The transmission 800 further includes a first end wall 882 generally at one end of the transmission 800 and a second end wall 884 generally at an opposing end of the transmission 800. The housing 880 joins the first and second end walls 882, 884. It should be appreciated that the housing 880 and the first and second end walls 882, 884 form a transmission casing, and may be integrated, or may each be a separate component or components of the casing. The transmission casing may be referred to herein as 880, 882, 884. The transmission casing 880, 882, 884 defines a cavity 885. The end walls 882 and 884 enclose the cavity 885 axially, but are likely a conical or irregular shape rather than a planar shape as schematically depicted.

The planetary gear sets 820, 830, and 840 and torque-transmitting mechanisms 850, 852, 854, 856, 857, and 858 are located in the cavity 885. The housing 880, end walls 882 and 884 and the planetary gear sets 820, 830 and 840 cooperate to define five spaces or zones in the cavity 885. A first zone I is defined between an outer surface 886 of the first end wall 882 and a plane 888 running generally parallel with a side of the planetary gear set 820 adjacent the first end wall 882, and runs radially outward to a circumferential boundary 890 running along a radially-outermost periphery of each of the ring gear members 824, 834 and 844. A second zone II is defined between a plane 892 running generally parallel along a side of the planetary gear set 820 facing the planetary gear set 830, a plane 894 running generally parallel along a side of the planetary gear set 830 facing the planetary gear set 820 and the circumferential boundary 890. A third zone III is defined between a plane 895 running generally parallel along a side of the planetary gear set 830 facing the planetary gear set 840, a plane 896 running generally parallel along a side of the planetary gear set 840 facing the planetary gear set 830 and the circumferential boundary 890. A fourth zone IV is defined between a plane 897 running generally parallel along a side of the planetary gear set 840 facing the second end wall 884, an outer surface 898 of the second end wall 884 and the circumferential boundary 890. A fifth zone V is defined between the circumferential boundary 890, an outer surface 899 of the housing 880, and the outer surfaces 886 and 898 of the first and second end walls 882 and 884, respectively. The structural member 881 traverses zones II and V.

Torque-transmitting mechanisms 850, 852, 854, and 856 are rotating-type clutches and torque-transmitting mechanisms 857 and 858 are brakes, also referred to as reaction clutches. Torque-transmitting mechanism 850 is selectively engagable to connect the carrier member 846 for common rotation with the ring gear member 824. The torque-transmitting mechanism 852 is selectively engagable to connect the input member 812 for common rotation with the ring gear member 824. The torque-transmitting mechanism 854 is selectively engagable to connect the carrier member 846 for common rotation with the carrier member 836. The torque-transmitting mechanism 856 is selectively engagable to connect the input member 812 and the sun gear member 842 for common rotation with the carrier member 836. The torque-transmitting mechanism 857 is selectively engagable to ground the carrier member 826 (as well as the sun gear member 832 and ring gear member 844) to the transmission housing 880 via the structural member 881. The torque-transmitting mechanism 858 is selectively engagable to ground the carrier member 836 to the transmission housing 880 via the structural member 881.

The transmission 800 provides eight forward speed ratios and one reverse speed ratio between the input member 812 and the output member 814. Specifically, a reverse speed ratio is established by engaging torque-transmitting mechanisms 852 and 858; a first forward speed ratio is established by engaging torque-transmitting mechanisms 854 and 858; a second forward speed ratio is established by engaging torque-transmitting mechanisms 854 and 857; a third forward speed ratio is established by engaging torque-transmitting mechanisms 850 and 854; a fourth forward speed ratio is established by engaging torque-transmitting mechanisms 852 and 854; a fifth forward speed ratio is established by engaging torque-transmitting mechanisms 854 and 856; a sixth forward speed ratio is established by engaging torque-transmitting mechanisms 852 and 856; a seventh forward speed ratio is established by engaging torque-transmitting mechanisms 850 and 856; and an eighth forward speed ratio is established by engaging torque-transmitting mechanisms 856 and 857.

As shown in FIG. 9A, torque-transmitting mechanism 852 is located in zone I; torque-transmitting mechanisms 857 and 858 are located in zone II; torque-transmitting mechanism 850 is disposed in zone III; and torque-transmitting mechanisms 854 and 856 are disposed in zone IV. Alternatively, the interconnections between the various gear members, the input member 812, the output member 814 and the housing 880 obtained by selective engagement of the various torque-transmitting mechanism as described above are possible with the torque-transmitting mechanisms 850, 852, 854, 856, 857 and 858 disposed in other zones as shown in the chart of FIG. 9B. An "X" in the chart of FIG. 9B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 9B is feasible independently of the other rows. Accordingly, torque-transmitting mechanism 850 is locatable in any of four possible zones; torque-transmitting mechanism 852 is locatable if any of four possible zones; torque-transmitting mechanism 854 is locatable in any of three possible zones; torque transmitting mechanism 856 is locatable in any of three possible zones; torque-transmitting mechanism 857 is locatable in any of the three possible zones; and torque-transmitting mechanism 858 is locatable in any of two possible zones.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
    a transmission casing having a first end wall, a second end wall, and a housing portion interconnecting the first end wall and the second end wall; wherein the end walls and the housing portion define a cavity;
    an input member;
    an output member;
    first, second and third planetary gear sets within the cavity, each planetary gear set having a sun gear member, a ring gear member, and a carrier member rotatably supporting a plurality of pinion gears intermeshing with both the ring gear member and the sun gear member;
    wherein the transmission casing and the planetary gear sets define five zones within the cavity, including a first zone extending axially from the first end wall to the second planetary gear set and extending radially to an outer periphery of the planetary gear sets; a second zone extending axially from the second planetary gear set to the third planetary gear set and extending radially to the outer periphery of the planetary gear sets; a third zone extending axially from the third planetary gear set to the first planetary gear set and extending radially to the outer periphery of the planetary gear sets; a fourth zone extending axially from the first planetary gear set to the second end wall and extending radially to the outer periphery of the planetary gear sets, and a fifth zone bordering the first, second, third, and fourth zones and extending radially outward to the housing portion and axially between the first and second end walls;
    wherein the sun gear member of the first planetary gear set is grounded to the transmission casing;
    an interconnecting member continuously interconnecting for common rotation the carrier member of the first planetary gear set, the sun gear member of the second planetary gear set and the ring gear member of the third planetary gear set;
    a first torque-transmitting mechanism selectively engagable to connect the ring gear member of the first planetary gear set for common rotation with the carrier member of the third planetary gear set;
    a second torque-transmitting mechanism selectively engagable to connect the ring gear member of the first planetary gear set for common rotation with the sun gear member of the third planetary gear set;
    a third torque-transmitting mechanism selectively engagable to connect the carrier member of the third planetary gear set for common rotation with the carrier member of the second planetary gear set;
    a fourth torque-transmitting mechanism selectively engagable to connect the sun gear member of the third planetary gear set for common rotation with the carrier member of the second planetary gear set;
    a fifth torque-transmitting mechanism selectively engagable to ground the carrier member of the first planetary gear set to the transmission housing;
    a sixth torque-transmitting mechanism selectively engagable to ground the carrier member of the second planetary gear set to the transmission housing;
    wherein the first torque-transmitting mechanism is located in one of the third, fourth, and fifth zones; wherein the second torque-transmitting mechanism is located in one of the first, third, fourth, and fifth zones; wherein the third torque-transmitting mechanism is located in one of the first, second, and fifth zones; wherein the fourth torque-transmitting mechanism is located in one of the first and second zones; wherein the fifth torque-transmitting mechanism is located in one of the second, third and fifth zones; wherein the sixth torque-transmitting mechanism is located in one of the first, second, third, and fifth zones;
    wherein the six torque-transmitting mechanisms are selectively engagable in different combinations to provide eight forward speed ratios and a reverse speed ratio between the input member and the output member; and
    wherein the input member and the output member extend through the first end wall and not through the second end wall.

2. The multi-speed transmission of claim 1, wherein the first torque-transmitting mechanism is located in the third zone; wherein the second torque-transmitting mechanism is located in the third zone; wherein the third torque-transmitting mechanism is located in the second zone; wherein the fourth torque-transmitting mechanism is located in the first zone; wherein the fifth torque-transmitting mechanism is located in the fifth zone; and wherein the sixth torque-transmitting mechanism is located in the second zone.

3. The multi-speed transmission of claim 1, wherein the first torque-transmitting mechanism is located in the third zone.

4. The multi-speed transmission of claim 1, wherein the second torque-transmitting mechanism is located in the third zone.

5. The multi-speed transmission of claim 1, wherein the third torque-transmitting mechanism is located in the second zone.

6. The multi-speed transmission of claim 1, wherein the fourth torque-transmitting mechanism is located in the first zone.

7. The multi-speed transmission of claim 1, wherein the fifth torque-transmitting mechanism is located in the fifth zone.

8. The multi-speed transmission of claim 1, wherein the sixth torque-transmitting mechanism is located in the second zone.

* * * * *